(12) United States Patent
Hodgkins et al.

(10) Patent No.: US 11,596,931 B2
(45) Date of Patent: Mar. 7, 2023

(54) ZEOLITES WITH TETRA-COORDINATED LEWIS ALUMINUM SITES AND METHODS FOR THEIR PREPARATION

(71) Applicants: Saudi Arabian Oil Company, Dhahran (SA); King Abdullah University of Science and Technolgy, Thuwal (SA)

(72) Inventors: Robert Peter Hodgkins, Dhahran (SA); Omer Refa Koseoglu, Dhahran (SA); Jean-Marie Basset, Thuwal (SA); Kuo-Wei Huang, Thuwal (SA); Anissa Bendjeriou-Sedjerari, Thuwal (SA); Sathiyamoorthy Murugesan, Thuwal (SA); Rajesh Parsapur, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 240 days.

(21) Appl. No.: 17/015,653

(22) Filed: Sep. 9, 2020

(65) Prior Publication Data
US 2022/0072521 A1    Mar. 10, 2022

(51) Int. Cl.
| | | |
|---|---|---|
| *B01J 35/00* | (2006.01) | |
| *B01J 29/40* | (2006.01) | |
| *B01J 37/04* | (2006.01) | |
| *C01B 39/02* | (2006.01) | |
| *C01B 39/38* | (2006.01) | |
| *B01J 20/18* | (2006.01) | |
| *C08F 4/657* | (2006.01) | |

(52) U.S. Cl.
CPC .............. *B01J 29/40* (2013.01); *B01J 20/18* (2013.01); *B01J 37/04* (2013.01); *C01B 39/026* (2013.01); *C01B 39/38* (2013.01); *C08F 4/6576* (2013.01)

(58) Field of Classification Search
None
See application file for complete search history.

(56) References Cited

U.S. PATENT DOCUMENTS 3,691,101 A    9/1972    Merlzweiller et al.

FOREIGN PATENT DOCUMENTS

WO    2020128668 A1    6/2020

OTHER PUBLICATIONS

Alrais, "Titanium Neopentyl supported onto KCC-1 and Al-modified KCC-1 and its Catalytic Application for Ethylene polymerization", Thesis, Aug. 2018.
Werghi et al., "Signle-Site Tetracoordinated Aluminum Hydride Supported on Mesoporous Silica. From Dream to Reality!", Organometallics, vol. 35, No. 19, pp. 3288-3294, Sep. 26, 2016.
Werghi, "Catalysis by deisgn: Well-Defined Aluminum tetra-coordinated Surface Ligand for Catalytic applications", Dissertation, Nov. 2018.
Werghi et al., "Exploiting the interactions between the ruthenium Hoveyda-Grubbs catalyst and Al-modified mesoporous silica: the case of SBA15 vs KCC-1", Chemical Science, vol. 9, pp. 3531-3537, 2018.
International Search Report and Written Opinion dated May 3, 2021 pertaining to International application No. PCT/US2020/060213 filed Nov. 12, 2020, 17 pages.
Marques, J.P. et al. "Dealumination of HBEA zeolite by steaming and acid leaching: distribution of the various aluminic species and identification of the hydroxyl groups", Comptes Rendus Chimie, Elsevier, Paris, FR, vol. 8, No. 3-4, Mar. 1, 2005, pp. 399-410.
Feng M. et al. "Fundamental Study on Mechanisms of Thermal Decomposition and Oxidation of Aluminum Hydride", The Journal of Physical Chemistry C, vol. 123, No. 40, Sep. 13, 2019, pp. 24436-24445.

*Primary Examiner* — Sheng H Davis
(74) *Attorney, Agent, or Firm* — Dinsmore & Shohl LLP

(57) ABSTRACT

Modified crystalline zeolite materials have a zeolite framework with both tetra-coordinate Lewis aluminum single sites and Brønsted aluminum sites. The tetra-coordinate Lewis aluminum single sites include aluminum atoms covalently bonded to a variable group and to two oxygen atoms and further coordinated to a third oxygen atom. The variable group may be alkyl, hydride, or hydroxyl. Methods for incorporating tetra-coordinate Lewis aluminum single sites into a crystalline zeolite material include contacting the crystalline zeolite material with a dialkylaluminum hydride $R_2AlH$, where each R is alkyl, to react the dialkylaluminum hydride with the zeolite framework and form tetra-coordinate alkyl aluminum single sites. Heating the alkyl-aluminum zeolite induces β-hydride elimination of the alkyl groups, whereby tetra-coordinate aluminum hydride single sites are formed. By oxidizing the hydride-aluminum zeolite, at least a portion of the tetra-coordinate aluminum hydride single sites are converted to tetra-coordinate aluminum hydroxide single sites.

20 Claims, 22 Drawing Sheets

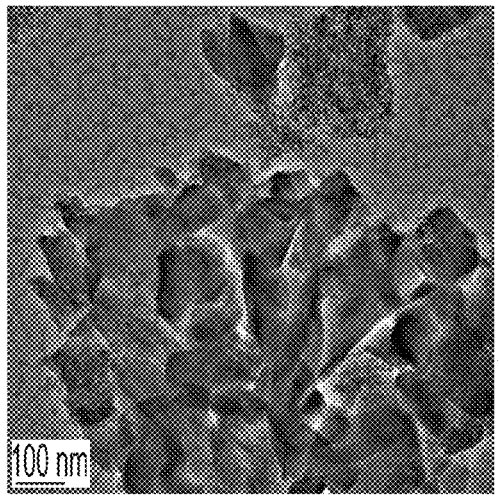 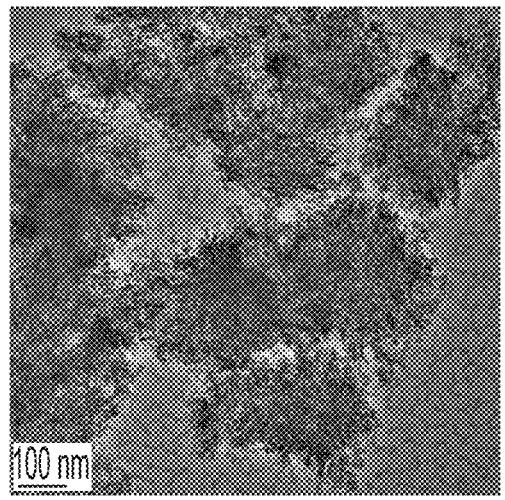
FIG. 20A  FIG. 20B
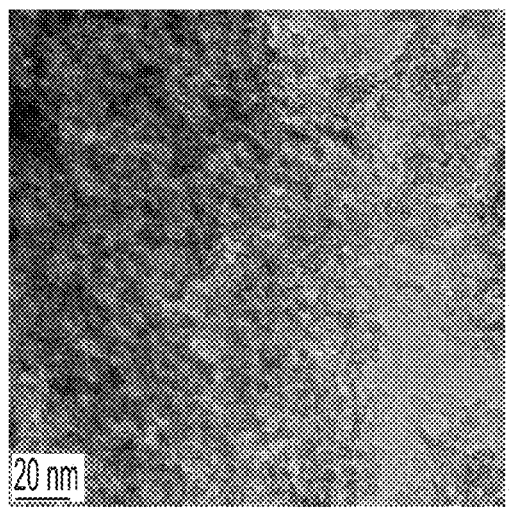 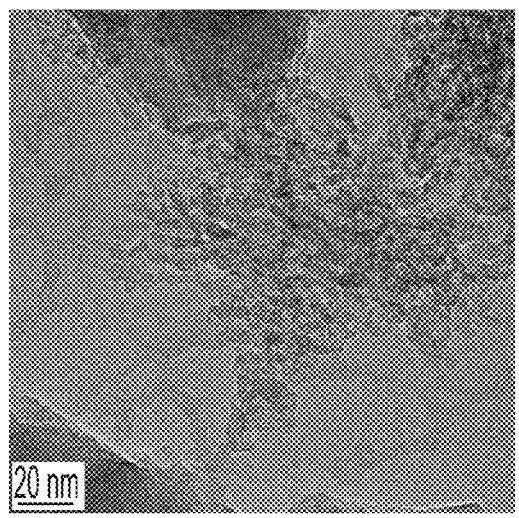
FIG. 20C  FIG. 20D

ZEOLITES WITH TETRA-COORDINATED LEWIS ALUMINUM SITES AND METHODS FOR THEIR PREPARATION

TECHNICAL FIELD

This application relates generally to modified zeolites and methods for modifying the zeolites and, more specifically, to zeolites including tetra-coordinated Lewis acidic aluminum single sites and to methods for preparing the zeolites.

BACKGROUND

Zeolites have widespread uses in many diverse industries. In the petroleum industry, for example, zeolite catalysts may be included in processes such as fluid catalytic cracking (FCC) and hydrocracking to catalyze reactions such as hydrogenation, dehydrogenation, isomerization, alkylation, and cracking, for example. These processes each share constant needs for developing zeolites having single sites with goals such as increased activity and increased shape selectivity with control and predictability. A greater understanding of the active sites in a zeolite can benefit searches for catalyst materials that are highly selective to catalyzing individual chemical reactions over other chemical reactions, thereby giving preference to desirable products of the selected reactions. There remain ongoing needs for zeolites having structures with active sites that are highly defined in terms of number, structure, and properties.

SUMMARY

Against the above background, example embodiments of this disclosure are directed to modified crystalline zeolite materials having a zeolite framework. The zeolite framework includes both tetra-coordinate Lewis aluminum sites and Brønsted aluminum sites incorporated in the zeolite framework. The tetra-coordinate Lewis aluminum single sites have an environment in the zeolite framework according to structure (A-I):

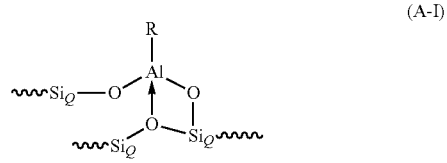

(A-I)

In the structure (A-I): each R is independently selected from the group consisting of an alkyl, a hydride, and a hydroxyl; and each $Si_Q$ is a silicon atom of the zeolite framework and is bonded to four oxygen atoms. The Brønsted aluminum sites have an environment in the zeolite framework according to structure (A-II):

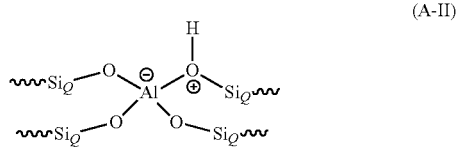

(A-II)

In the structure (A-II), each $Si_Q$ is a silicon atom of the zeolite framework and is bonded to four oxygen atoms.

Further example embodiments of this disclosure are directed to methods for incorporating tetra-coordinate Lewis aluminum single sites into a crystalline zeolite material having a zeolite framework comprising Brønsted aluminum sites. The methods include contacting the crystalline zeolite material with a dialkylaluminum hydride of empirical formula $R_2AlH$, where each R is alkyl, to react the dialkylaluminum hydride with the zeolite framework and form tetra-coordinate alkyl aluminum sites having an environment in the zeolite framework according to structure (B-I):

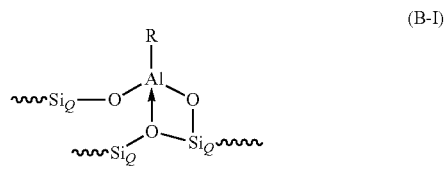

(B-I)

In structure (B-I), each $Si_Q$ is a silicon atom of the zeolite framework and is bonded to four oxygen atoms. The methods form a modified crystalline zeolite material that is an alkyl-aluminum zeolite.

In some embodiments, the methods for incorporating tetra-coordinate Lewis aluminum single sites into a crystalline zeolite material further include heating the alkyl-aluminum zeolite to induce β-hydride elimination of at least a portion of the alkyl groups R and thereby form tetra-coordinate aluminum hydride single sites having an environment in the zeolite framework according to structure (B-I), in which R is a hydride.

In some embodiments, the methods for incorporating tetra-coordinate Lewis aluminum single sites into a crystalline zeolite material further include oxidizing the hydride-aluminum zeolite to convert at least a portion of the tetra-coordinate aluminum hydride single sites to tetra-coordinate aluminum hydroxide sites having an environment in the zeolite framework according to structure (B-I), in which R is a hydroxyl.

These and other features, aspects, and advantages of the present invention will become better understood with reference to the following description and the appended claims.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 20A-20D are micrographs of the hydroxide-aluminum zeolite prepared by oxidizing the hydride-aluminum zeolite, acquired by TEM.

DETAILED DESCRIPTION

Figure 1:
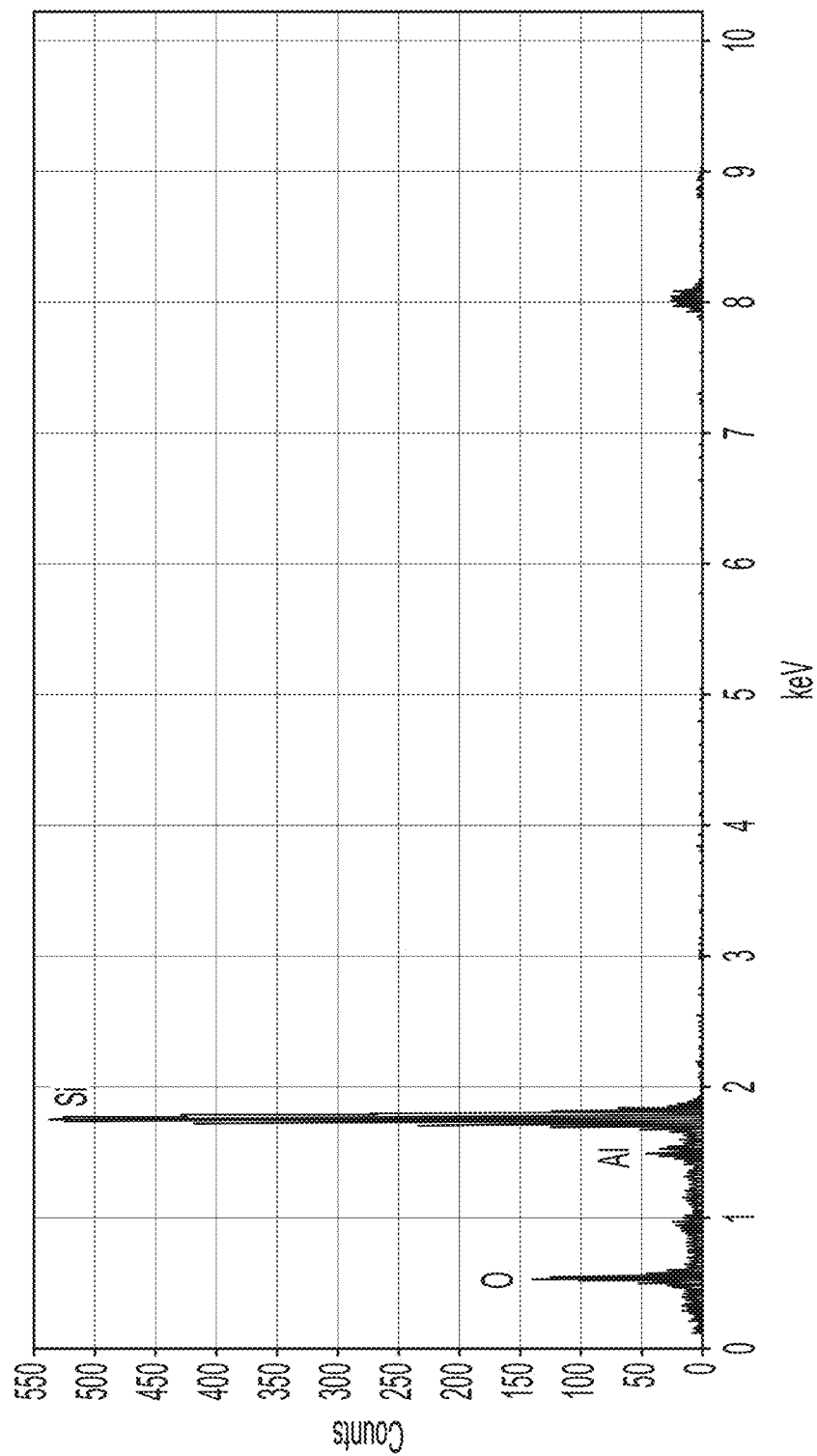
FIG. 1 is an Energy Dispersive X-Ray (EDX) spectrum of FH-ZSM-5 zeolite before dehydroxylation.
Figure 2A:
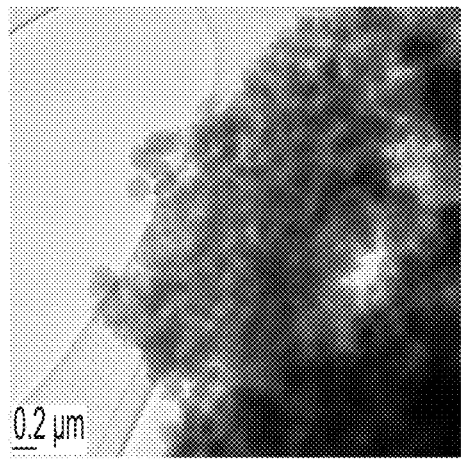
FIGS. 2A-2D are micrographs of FH-ZSM-5 zeolite before dehydroxylation acquired by Transmission Electron Microscopy (TEM).
Figure 2B:
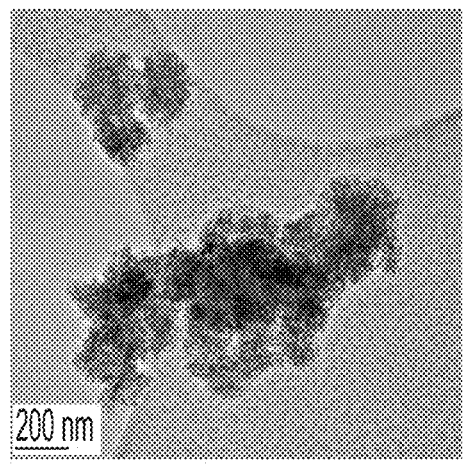
Figure 2C:
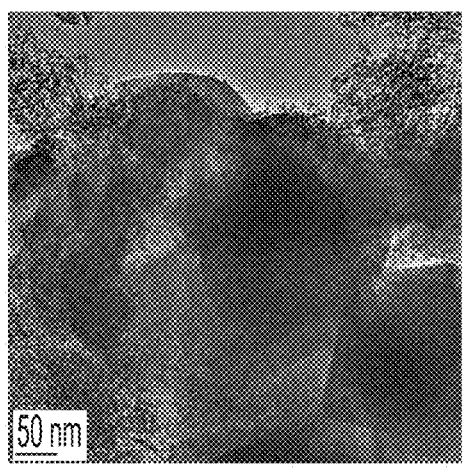
Figure 2D:
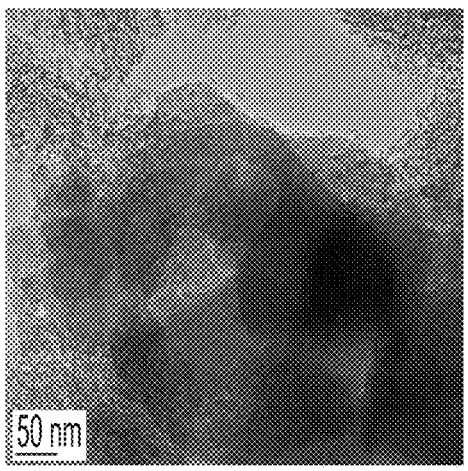

As used herein, the customary triple-bond symbol "≡" used, as in "≡X" where X is any element of the Periodic Table, refers to three associations of an atom of element X to respective ones of three individual oxygen atoms. The associations may include covalent single bonds, dative coordinations, or a combination thereof. Generally in the context of tetra-coordinate aluminum single sites of zeolites of this disclosure, the three associations may include two covalent single bonds (one to each of two oxygen atoms) and one coordination of the atom of element X to a third oxygen atom. Thus, for example, "[≡Al—R]" refers to an aluminum atom covalently bonded to two oxygen atoms, coordinated with a third oxygen atom (of a siloxane bridge, for example), and also covalently bonded to a group R, where R is, for example, an alkyl, a hydrogen atom, or hydroxyl. Consistent with this definition, the tetra-coordinate aluminum single species "[≡Al—R]" as described may be considered in the context of the zeolites according to embodiments to be an abbreviated form of the structural notation [(≡Si—O—Si≡)(≡Si—O)$_2$Al—R]. In this notation, the silicon atoms in the portion [≡Si—O] are each covalently bonded to four oxygen atoms.

In some embodiments of this disclosure, modified crystalline zeolite materials are described that include a well-defined aluminum Lewis acid single site that can be used as an anchor site for the immobilization of an active metal for catalysis. The aluminum Lewis acid single site offers the opportunity to control the acidity of the zeolite support and to promote greater conversion rates and efficiencies than are attainable from zeolites that do not include the well-defined aluminum Lewis acid single sites.

In further embodiments, methods are described for preparing the modified crystalline zeolite materials with the well-defined aluminum Lewis acid single sites. Owing to the large scale application of acid zeolites in industrial settings, considerable efforts have been devoted to control the number and strength of the zeolite acid sites, with the aim of optimizing the catalyst design. The methods of this disclosure facilitate increased levels of control of zeolite acidity by careful design of the acidic site. In particular, [≡Al-alkyl], [≡Al—H], and [≡Al—OH] species are examples of well-defined anchor sites for any active metal such as platinum, nickel, cobalt, palladium, molybdenum, titanium, zirconium, and hafnium, for example. Each of the [≡Al-alkyl], [≡Al—H], and [≡Al—OH] species is remarkable for zeolite materials in that they include aluminum atoms in an unusual tetra-coordinate environment within the zeolite framework. The tetra-coordinate aluminum sites [≡Al-alkyl], [≡Al—H], and [≡Al—OH] cannot be prepared by conventional strategies in a controlled manner. It should be understood that in such tetra-coordinate aluminum sites, the aluminum atoms remain trivalent, even if coordination with oxygen atoms increases the coordination number of the aluminum atom.

Aluminosilicate zeolite frameworks are composed of tetrahedral sites (T-sites) occupied by silicon atoms that are linked through a bridging oxygen atom. When a silicon atom is replaced with aluminum, a negative charge is imparted to the zeolite framework and shared among the four bridging oxygen atoms, and it is counterbalanced by a Brønsted acidic proton or an extra-lattice cationic site or complex. Brønsted acidic protons are so-called based on the well-understood Brønsted-Lowry definition of acids, in which as a fundamental concept, when an acid HA and a base B react with each other, the acid forms its conjugate base X⁻, and the base forms its conjugate acid HB⁺ by exchange of a proton. In the case of Brønsted aluminum sites in zeolites, an acidic species form may be represented by ≡Al⁻—O⁺(H)—Si≡. By interaction with a base such as sodium hydroxide (NaOH), for example, a conjugate base ≡Al⁻—O⁺(Na)—Si≡ may be formed along with a molecule of water (the conjugate acid of OH⁻).

The modified crystalline zeolite materials according to embodiments of the present application, as well as the modified crystalline zeolite materials prepared according to methods of the present application, include modified tetra-coordinate Lewis aluminum single sites, conventional Brønsted aluminum sites, and conventional Lewis aluminum sites. Lewis aluminum sites are characterized consistently with the Lewis theory of acidity, in which Lewis acid is defined as a chemical species that contains an empty orbital that is capable of accepting an electron pair from a Lewis base to form a Lewis adduct. Conversely, a Lewis base is any species that has a filled orbital containing an electron pair which is not involved in bonding but may form a dative bond with a Lewis acid to form a Lewis adduct.

In the case of modified tetra-coordinate Lewis aluminum single sites in the modified crystalline zeolite materials according to embodiments, it should be understood that an aluminum atom in a charge-neutral state includes three valence electrons. Even so, in a zeolite framework aluminum atoms bonded already to three other atoms can, under certain circumstances described in the present disclosure, behave as a Lewis acid that accepts electron density from a lone pair from a Lewis basic oxygen atom, thereby forming an adduct between the aluminum atom and the oxygen atom. The result of this adduct formation is a tetra-coordinate aluminum atom covalently bonded to the three original substituents while datively bonded to the fourth substituent, the electron-donating oxygen atom. It should be understood that, in the figures and images in the present application, covalent bonds are represented by customary lines between atoms, while dative bonds are represented by an arrow drawn from the electron donor (the Lewis base) to the electron acceptor (the Lewis acid).

Reference will now be made in detail to embodiments of modified crystalline zeolite materials including tetra-coordinate Lewis aluminum single sites. Embodiments of methods for incorporating tetra-coordinate Lewis aluminum single sites into a crystalline zeolite material to form the modified crystalline zeolite materials will be described subsequently.

Modified crystalline zeolite materials according to embodiments of this disclosure have a zeolite framework that includes both tetra-coordinate Lewis aluminum single sites and Brønsted aluminum sites incorporated in the zeolite framework. The tetra-coordinate Lewis aluminum sites have an environment in the zeolite framework according to structure (A-I):

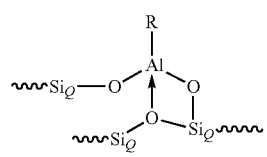

(A-I)

In the structure (A-I), each R is independently selected from the group consisting of an alkyl, a hydride, and a hydroxyl. Each $Si_Q$ is a silicon atom of the zeolite framework that is bonded to four oxygen atoms. The Brønsted aluminum sites have an environment in the zeolite framework according to structure (A-II):

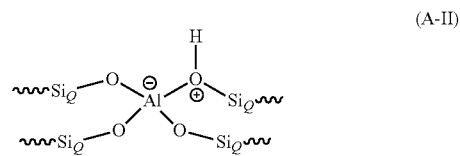

(A-II)

In structure (A-II) also, each $Si_Q$ is a silicon atom of the zeolite framework that is bonded to four oxygen atoms.

In embodiments of the modified crystalline zeolite materials, the crystalline zeolite material that is modified may be any zeolite that includes Brønsted aluminum sites and that also includes sites other than the Brønsted aluminum sites that are reactive toward the dialkylaluminum hydride. A "zeolite" in this regard includes crystalline materials with a framework composed of aluminium, silicon, and oxygen, with optional substitutions or replacements. Zeolites include aluminosilicates with a three dimensional framework and molecular sized pores. Certain zeolitic materials are ordered, porous crystalline aluminosilicates having a definite crystalline structure as determined by X-ray diffraction, within which there are a large number of smaller cavities that may be interconnected by a number of still smaller channels or windows. These cavities and pores are uniform in size within a specific zeolite material. Because the dimensions of these pores are such as to accept for adsorption molecules of certain dimensions while rejecting those of larger dimensions, these materials are known as "molecular sieves" and are utilized in a variety of ways to take advantage of these properties. The term "zeolite" with respect to the crystalline zeolite material according to embodiments further may include any member of a group of structured aluminosilicate minerals including cations such as sodium, calcium, barium, beryllium, lithium, potassium, magnesium, strontium, or combinations of these, generally conforming to a nominal formula, $H_xAl_xSi_{1-x}O_2$, where H may be replaced by any other univalent cation, or (when the x related to H is divided by the valence) a multivalent cation.

The term "zeolite" with respect to the crystalline zeolite material that is modified in embodiments further includes "zeolite-related materials" or "zeotypes" prepared by replacing $Si^{4+}$ or $Al^{3+}$ with other elements as in the case of aluminophosphates (for example, MeAPO, SAPO, EIAPO, MeAPSO, and EIAPSO), gallophosphates, zincophosphates, and titanosilicates.

The crystalline zeolite material zeolite that is modified according to embodiments may include any crystalline porous material with a framework as described in the Zeolite Framework Types database of the IZA structure commission under a structure type defined by the International Zeolite Association such as ABW, ACO, AEI, AEL, AEN, AET, AFG AFI, AFN, AFO, AFR, AFS, AFT, AFX, AFY, AHT, ANA, APC, APD, AST, ASV, ATN, ATO, ATS, ATT, ATV, AWO, AWW, BCT, *BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBN, SBS, SBT, SFE, SFF, SFG, SFH, SFN, SFO, SGT, SIV, SOD, SOS, SSF, SSY, STF, STI, STO, STT, SZR, TER, THO, TOL, TON, TSC, TUN, UEI, UFI, UOZ, USI, UTL, VET, VFI, VNI, VSV, WEI, WEN, YUG, and ZON. The crystalline zeolite material according to embodiments may include intergrowth zeolites, in which the crystalline zeolite material includes at least two individual intergrown zeolite portions within a single zeolite crystal and the intergrown zeolite portions include zeolite portions of at least two different framework types, each selected from the foregoing framework types.

The crystalline zeolite material that is modified according to embodiments may be microporous, mesoporous, macroporous, or may have multiple classes of pore sizes selected from any one, two, or three of the classifications of micropores, mesopores, and macropores, including in any instance pore sizes less than 2 nm or greater than 50 nm. Generally, porous substances are divided by pore size. For example, substances having pore sizes smaller than 2 nanometers are classified as microporous substances, substances having pore sizes between 2 nm and 50 nm are classified as mesoporous substances, and substances having pore sizes larger than 50 nm are classified as macroporous substances. It should be understood that non-zeolitic mesoporous silicas, such as MCM-41 and SBA-15, can exhibit substantial microporosity. This type of microporosity is non-ordered and not well-defined, however, and should not be considered zeolitic. It should be understood that the terms "crystalline zeolite material" and "zeolite" in this disclosure do not encompass any type of mesoporous silica.

In example embodiments, the modified crystalline zeolite materials may be modified forms of zeolites such as aluminosilicate zeolites, aluminophosphate zeolites, metal-substituted aluminophosphate (MeAPO) zeolites, and silicoaluminophosphate (SAPO) zeolites, to any of which the tetra-coordinate Lewis aluminum single sites are added. In some embodiments, the modified crystalline zeolite materials are aluminosilicate zeolites including Brønsted aluminum sites to which the tetra-coordinate Lewis aluminum single sites are added.

In more specific example embodiments, the modified crystalline zeolite materials may be modified forms of aluminosilicate zeolites with an MFI framework such as ZSM-5 or acidic H-ZSM-5, to which the tetra-coordinate Lewis aluminum single sites are added. Any of the foregoing examples of modified crystalline zeolite materials may contain other elements either within the zeolite framework or as extra-framework species, provided the modified crystalline zeolite materials include Brønsted aluminum sites according to the structure (A-II) and tetra-coordinate Lewis aluminum single sites according to the structure (A-I). Examples of other elements that may be included within the modified crystalline zeolite materials include, without limitation, antimony, arsenic, barium, beryllium, bismuth, boron, calcium, cerium, chromium, cobalt, copper, erbium, europium, gallium, germanium, gold, hafnium, indium, iridium, iron, lanthanum, lithium, magnesium, manganese, molybdenum, neodymium, nickel, niobium, osmium, palladium, phosphorus, platinum, praseodymium, rhodium, rhenium, ruthenium, silver, scandium, strontium, tantalum, terbium, tin, titanium, tungsten, vanadium, ytterbium, yttrium, zinc, zirconium, extra-framework aluminum, and extra-framework silicon.

ZSM-5 zeolite is an aluminosilicate zeolite of an MFI framework and belonging to the pentasil family of zeolites. ZSM-5 zeolite belongs to the orthorhombic space group Pnma with ideal cell parameters of a=20.1 Angstrom (2.01 nanometer), b=19.7 Angstrom (1.97 nm), and c=13.1 Angstrom (1.31 nanometer). ZSM-5 has a nominal chemical formula of $Na_nAl_nSi_{96-n}O_{192} \cdot 16H_2O$, where subscript n is from 0 to 27. Cations such as sodium or protons counteract a charge imbalance resulting from replacement of silicon with aluminum in the zeolite. The acidified form of the ZSM-5 zeolite, in which a substantial number of acidic protons balance the charge, may be referred to as H-ZSM-5. The subscript n in the ZSM-5 implicates a silica-to-alumina ratio (SAR) of the zeolite. Except as may be explicitly stated to the contrary, embodiments of this disclosure including ZSM-5 zeolites are not limited in any regard with respect to the SAR of the ZSM-5 zeolite or of any other zeolite including silica and alumina.

The modified crystalline zeolite materials according to embodiments, are both zeolites and crystalline. Crystalline zeolite materials are to be clearly distinguished from amorphous materials such as mesoporous silica, of which the composition SBA-15 is a well-known example. Mesoporous silica is an amorphous material with pore sizes ranging from 2 nm to 50 nm and having low hydrothermal stability and acidity. Owing to the amorphous nature of mesoporous silica, x-ray diffraction patterns of such compositions typically contain few peaks, nearly all of which appear at less than 5 degrees two-theta. In contrast, crystalline zeolite materials may contain varied pore sizes within a single zeolite, including micropores with sizes less than 2 nm, mesopores with sizes from 2 nm to 50 nm, macropores with sizes greater than 50 nm, and combinations of any two or three pore types chosen from micropores, mesopores, and macropores. Crystalline zeolites have high thermal stability and high acidity. Owing to the crystallinity of zeolites, x-ray diffraction patterns of the materials generally include many strong peaks, typically at angles greater than 5 degrees two-theta.

With regard to composition, mesoporous silicas such as SBA-15 include a very high number of silanol groups and partially condensed frameworks as compared to crystalline zeolites. The number of hydroxyl groups present in mesoporous silicas can be varied by known preparation techniques. These compositional features of mesoporous silicas facilitate additions of Lewis aluminum sites to the mesoporous silicas under fairly simple reaction conditions for potentially anchoring active metals to the mesoporous silica. On the other hand, as recognized in the embodiments of the present description, modifications of crystalline zeolite structures such as ZSM-5 to include Lewis aluminum sites, for example, must be conducted under more challenging in vacuo thermal conditions, because the aluminum atoms in the crystalline tetrahedral framework quite readily come out of the zeolite framework with the removal of water. The aluminum atoms lost from the framework in this manner strongly prefer to form extra-framework species over forming framework aluminum sites, and certainly over framework Lewis aluminum sites. Moreover, the crystalline structure of zeolites with strong siloxane bonds and high hydrophilicity imposes challenges to the framework aluminum modifications that are not confronted with respect to aluminum modifications of compositions such as mesoporous silica.

In some embodiments, the modified crystalline zeolite material is an alkyl-aluminum zeolite that includes tetra-coordinate Lewis aluminum single sites of structure (A-I), in which the group R for at least a portion of the tetra-coordinate Lewis aluminum single sites of structure (A-I) is an alkyl, such as but not limited to $(C_1-C_{20})$ alkyls, for example. In some embodiments, the modified crystalline zeolite material includes tetra-coordinate Lewis aluminum single sites of structure (A-I), in which the group R for all of the tetra-coordinate Lewis aluminum single sites of structure (A-I) is an alkyl.

As used with respect to the group R of the Lewis aluminum single sites of structure (A-I), the term "alkyl" is to be understood in its broadest sense as referring to a saturated hydrocarbon radical that is straight-chained or branched, includes only carbon atoms and hydrogen atoms, and includes from 1 to 50 carbon atoms, from 1 to 40 carbon atoms, from 1 to 30 carbon atoms, from 1 to 20 carbon atoms, from 1 to 10 carbon atoms, from 1 to 5 carbon atoms, from 1 to 4 carbon atoms, from 3 to 10 carbon atoms, from 4 to 10 carbon atoms, or from 3 to 5 carbon atoms, for example. In some embodiments, group R may be selected from alkyl radicals that are capable of forming stable, monomeric dialkylaluminum hydride compounds of formula $R_2AlH$. Non-limiting examples of stable, monomeric dialkylaluminum hydride compounds of formula $R_2AlH$ include those disclosed in U.S. Pat. Nos. 4,170,604 and 3,015,669. In a specific non-limiting embodiment, the group R of the Lewis aluminum single sites of structure (A-I) of the modified crystalline zeolite material may be isobutyl.

Specific examples of straight-chain alkyls for group R include, without limitation, methyl, ethyl, n-propyl, n-butyl, n-pentyl, n-hexyl, n-heptyl, n-octyl, n-nonyl, and n-decyl. Examples of branched alkyls for group R include radicals of the formula —$CH_2CR^1R^2R^3$ where $R^1$, $R^2$, and $R_3$ are independently a $(C_1-C_5)$-alkyl or hydrogen, provided at least one of $R^1$, $R^2$, and $R^3$ is a $(C_1-C_5)$-alkyl. Non-limiting examples of such groups include 2,2-dimethylpropyl (neopentyl) and 3,3-dimethylbutyl (neohexyl). Further examples of branched alkyls for group R include radicals of the formula —$CH(R^1)$—$CH(R^2)(R^3)$, in which one of $R^1$ and $R^2$ is hydrogen and the other of $R^1$ and $R^2$ is a straight-chain or branched $(C_4-C_{15})$-alkyl, and $R^3$ is a straight-chain or branched $(C_4-C_{15})$-alkyl. Non-limiting examples of such groups include 1-methylpropyl (sec-butyl), 2-methylpropyl (isobutyl), 1-methylbutyl (sec-amyl), 2-methylbutyl, 1-methylpentyl, and 2-methylpentyl.

In some embodiments, the modified crystalline zeolite material is a hydride-aluminum zeolite that includes tetra-coordinate Lewis aluminum single sites of structure (A-I), in which the group R for at least a portion of the tetra-coordinate Lewis aluminum single sites of structure (A-I) is hydride (—H). In some embodiments, the modified crystalline zeolite material includes tetra-coordinate Lewis aluminum single sites of structure (A-I), in which the group R for all of the tetra-coordinate Lewis aluminum single sites of structure (A-I) is hydride.

In some embodiments, the modified crystalline zeolite material is a hydroxyl-aluminum zeolite that includes tetra-coordinate Lewis aluminum single sites of structure (A-I), in which the group R for at least a portion of the tetra-coordinate Lewis single aluminum sites of structure (A-I) is hydroxyl (—OH). In some embodiments, the modified crystalline zeolite material includes tetra-coordinate Lewis aluminum single sites of structure (A-I), in which the group R for all of the tetra-coordinate Lewis aluminum single sites of structure (A-I) is hydroxyl.

In some embodiments, the modified crystalline zeolite material includes tetra-coordinate Lewis aluminum single sites of structure (A-I), in which the group R may have different identities on different tetra-coordinate Lewis aluminum single sites of structure (A-I). In some embodiments, the modified crystalline zeolite material includes tetra-coordinate Lewis aluminum single sites of the modified crystalline zeolite material that include at least two of (a), (b), and (c): (a) tetra-coordinate Lewis aluminum single sites having an environment in the zeolite framework according to structure (A-I), where R is an alkyl; (b) tetra-coordinate Lewis aluminum single sites having an environment in the zeolite framework according to structure (A-I), where R is a hydride; and (c) tetra-coordinate Lewis aluminum single sites having an environment in the zeolite framework according to structure (A-I), where R is a hydroxyl.

In some embodiments, the modified crystalline zeolite material includes tetra-coordinate Lewis aluminum single sites of structure (A-I), in which the group R for some of the tetra-coordinate Lewis aluminum single sites of structure (A-I) are alkyl and for others of the tetra-coordinate Lewis aluminum single sites of structure (A-I) are hydride. In some embodiments, the modified crystalline zeolite material includes tetra-coordinate Lewis aluminum single sites of structure (A-I), in which the group R for some of the tetra-coordinate Lewis aluminum single sites of structure (A-I) are alkyl and for others of the tetra-coordinate Lewis aluminum single sites of structure (A-I) are hydroxyl. In some embodiments, the modified crystalline zeolite material includes tetra-coordinate Lewis aluminum single sites of structure (A-I), in which the group R for some of the tetra-coordinate Lewis aluminum single sites of structure (A-I) are hydride and for others of the tetra-coordinate Lewis aluminum single sites of structure (A-I) are hydroxyl. In some embodiments, the modified crystalline zeolite material includes tetra-coordinate Lewis aluminum single sites of structure (A-I), in which the group R for some of the tetra-coordinate Lewis aluminum single sites of structure (A-I) are alkyl, for others of the tetra-coordinate Lewis aluminum single sites of structure (A-I) are hydride, and for still others of the tetra-coordinate Lewis aluminum single sites of structure (A-I) are hydroxyl.

In some embodiments, the modified crystalline zeolite material includes tetra-coordinate Lewis aluminum single sites of the modified crystalline zeolite material comprise at least two of (a), (b), and (c): (a) tetra-coordinate Lewis aluminum single sites having an environment in the zeolite framework according to structure (A-I), where R is an alkyl; (b) tetra-coordinate Lewis aluminum single sites having an environment in the zeolite framework according to structure (A-I), where R is a hydride; and (c) tetra-coordinate Lewis aluminum single sites having an environment in the zeolite framework according to structure (A-I), where R is a hydroxyl.

Pore sizes of the modified crystalline zeolite material may vary, depending on the original zeolite framework of the zeolite that was modified to prepare the modified crystalline zeolite material. In some embodiments, the modified crystalline zeolite material may include any combinations of micropores, mesopores, and macropores. In example embodiments, the modified crystalline zeolite material may include micropores having micropore sizes less than 2 nm and mesopores having pore-size from 2 nm to 50 nm.

According to some embodiments, the modified crystalline zeolite material may be an alkyl-aluminum zeolite, in which a portion of the groups R of the Lewis aluminum single sites of structure (A-I), or all of the groups R of the Lewis aluminum single sites of structure (A-I) are alkyl. In such embodiments, the alkyl-aluminum zeolite may exhibit a band in the range 2850 cm$^{-1}$ to 2990 cm$^{-1}$ as measured by Fourier Transform Infrared Spectroscopy that is characteristic of aluminum-alkyl bonds of the tetra-coordinate alkyl aluminum sites. In specific example embodiments, the modified crystalline zeolite material may be an alkyl-aluminum zeolite, in which a portion of the groups R of the Lewis aluminum single sites of structure (A-I), or all of the groups R of the Lewis aluminum single sites of structure (A-I) are isobutyl.

According to some embodiments, the modified crystalline zeolite material may be a hydride-aluminum zeolite, in which a portion of the groups R of the Lewis aluminum single sites of structure (A-I), or all of the groups R of the Lewis aluminum single sites of structure (A-I) are hydride. In such embodiments, the hydride-aluminum zeolite may exhibit a band at 1952 cm$^{-1}$ as measured by Fourier Transform Infrared Spectroscopy that is characteristic of aluminum-hydride bonds of the tetra-coordinate aluminum hydride sites.

According to some embodiments, the modified crystalline zeolite material may be a hydroxyl-aluminum zeolite, in which a portion of the groups R of the Lewis aluminum single sites of structure (A-I), or all of the groups R of the Lewis aluminum single sites of structure (A-I) are hydroxyl. In such embodiments, the hydride-aluminum zeolite may exhibit a band at 3787 cm$^{-1}$ as measured by Fourier Transform Infrared Spectroscopy that is characteristic of aluminum-hydroxyl bonds of the tetra-coordinate aluminum hydroxide sites.

Having described the modified crystalline zeolite material according to embodiments, methods for incorporating tetra-coordinate Lewis aluminum single sites into a crystalline zeolite material having a zeolite framework containing Brønsted aluminum sites will now be described.

Methods for incorporating tetra-coordinate Lewis aluminum single sites into a crystalline zeolite material include contacting the crystalline zeolite material with a dialkylaluminum hydride of empirical formula R$_2$AlH, where each R is alkyl. The dialkylaluminum hydride reacts with the zeolite framework and forms tetra-coordinate alkyl aluminum sites. The resulting modified crystalline zeolite material is an alkyl-aluminum zeolite. The tetra-coordinate alkyl aluminum single sites have an environment in the zeolite framework according to structure (B-I):

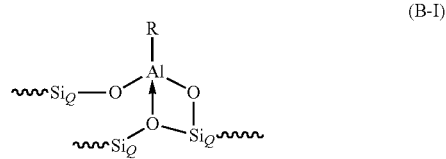

(B-I)

In structure (B-I), each Si$_Q$ is a silicon atom of the zeolite framework that is bonded to four oxygen atoms.

In embodiments of the methods for incorporating tetra-coordinate Lewis aluminum single sites into the crystalline zeolite material, the crystalline zeolite material may be any zeolite that includes Brønsted aluminum sites and that also includes sites other than the Brønsted aluminum sites that are reactive toward the dialkylaluminum hydride. A "zeolite" in this regard includes crystalline materials with a framework composed of aluminium, silicon, and oxygen, with optional substitutions or replacements. Commonly, zeolites are described as aluminosilicates with a three dimensional framework and molecular sized pores. Certain zeolitic materials are ordered, porous crystalline aluminosilicates having a definite crystalline structure as determined by X-ray diffraction, within which there are a large number of smaller cavities that may be interconnected by a number of still smaller channels or windows. These cavities and pores are uniform in size within a specific zeolite material. Because the dimensions of these pores are such as to accept for adsorption molecules of certain dimensions while rejecting those of larger dimensions, these materials are known as "molecular sieves" and are utilized in a variety of ways to take advantage of these properties. The term "zeolite" with respect to the crystalline zeolite material according to embodiments also may include any member of a group of structured aluminosilicate minerals including cations such as sodium, calcium, barium, beryllium, lithium, potassium, magnesium, strontium, or combinations of these, generally conforming to a nominal formula, $H_xAl_xSi_{1-x}O_2$, where H may be replaced by any other univalent cation, or (when the x related to H is divided by the valence) a multivalent cation.

The term "zeolite" with respect to the crystalline zeolite material of embodiments further includes "zeolite-related materials" or "zeotypes" prepared by replacing Si$^{4+}$ or Al$^{3+}$ with other elements as in the case of aluminophosphates (for example, MeAPO, SAPO, EIAPO, MeAPSO, and EIAPSO), gallophosphates, zincophosphates, and titanosilicates.

In embodiments, the crystalline zeolite material zeolite may include any crystalline porous material with a framework as described in the Zeolite Framework Types database of the IZA structure commission under a structure type defined by the International Zeolite Association such as ABW, ACO, AEI, AEL, AEN, AET, AFG AFI, AFN, AFO, AFR, AFS, AFT, AFX, AFY, AHT, ANA, APC, APD, AST, ASV, ATN, ATO, ATS, ATT, ATV, AWO, AWW, BCT, *BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBN, SBS, SBT, SFE, SFF, SFG, SFH, SFN, SFO, SGT, SIV, SOD, SOS, SSF, SSY, STF, STI, STO, STT, SZR, TER, THO, TOL, TON, TSC, TUN, UEI, UFI, UOZ, USI, UTL, VET, VFI, VNI, VSV, WEI, WEN, YUG, and ZON. The crystalline zeolite material according to embodiments may include intergrowth zeolites, in which the crystalline zeolite material includes at least two individual intergrown zeolite portions within a single zeolite crystal and the intergrown zeolite portions include zeolite portions of at least two different framework types, each selected from the foregoing framework types.

Generally, porous substances are divided by pore size. For example, substances having pore sizes smaller than 2 nanometers are classified as microporous substances, substances having pore sizes between 2 nm and 50 nm are classified as mesoporous substances, and substances having pore sizes larger than 50 nm are classified as macroporous substances. The crystalline zeolite material according to embodiments may be microporous, mesoporous, macroporous, or may have multiple classes of pore sizes selected from any one, two, or three of the classifications of micropores, mesopores, and macropores, including in any instance pore sizes less than 2 nm or greater than 50 nm. It should be understood that non-zeolitic mesoporous silicas, such as MCM-41 and SBA-15, can exhibit substantial microporosity. This type of microporosity is non-ordered and not well-defined, however, and should not be considered zeolitic. It should be understood that the terms "crystalline zeolite material" and "zeolite" in this disclosure do not encompass any type of mesoporous silica.

In some example embodiments, the crystalline zeolite material may be chosen from aluminosilicate zeolites, aluminophosphate zeolites, metal-substituted aluminophosphate zeolites, and silicoaluminophosphate zeolites. In some embodiments, the crystalline zeolite material is an aluminosilicate zeolite. Aluminosilicate zeolites include silanol groups ($\equiv$Si—OH), for example, that are reactive toward the dialkylaluminum hydride. Particularly with regard to aluminosilicate zeolites. In further example embodiments, the crystalline zeolite material may be an aluminosilicate zeolite having an MFI framework, a *BEA framework, a mordenite (MOR) framework, a chabazite (CHA) framework, or a faujasite (FAU) framework, including intergrowth zeolites containing at least one zeolite portion having any of the foregoing framework types intergrown with an additional zeolite portion having a different framework type. In embodiments, the FAU zeolite may be a zeolite Y or a USY zeolite (ultra-stable zeolite Y). In specific non-limiting example embodiments, the crystalline zeolite material may be an aluminosilicate zeolite having an MFI framework such as, for example, ZSM-5 zeolite or acidic H-ZSM-5 zeolite.

The dialkylaluminum hydride of empirical formula $R_2AlH$ may be dimeric or monomeric. In embodiments, the dialkylaluminum hydride of empirical formula $R_2AlH$ is a stable monomeric compound. Non-limiting examples of stable, monomeric dialkylaluminum hydride compounds of formula $R_2AlH$ include those disclosed in U.S. Pat. Nos. 4,170,604 and 3,015,669. The two groups R of the dialkylaluminum hydride may be identical or different. In some embodiments, the two groups R of the dialkylaluminum hydride are identical. As used with respect to the groups R of the dialkylaluminum hydride, the term "alkyl" is to be understood in its broadest sense as referring to a saturated hydrocarbon radical that is straight-chained or branched, includes only carbon atoms and hydrogen atoms, and includes from 1 to 50 carbon atoms, from 1 to 40 carbon atoms, from 1 to 30 carbon atoms, from 1 to 20 carbon atoms, from 1 to 10 carbon atoms, from 1 to 5 carbon atoms, from 1 to 4 carbon atoms, from 3 to 10 carbon atoms, from 4 to 10 carbon atoms, or from 3 to 5 carbon atoms, for example.

Specific examples of straight-chain alkyls for group R of the dialkylaluminum hydride include, without limitation, methyl, ethyl, n-propyl, n-butyl, n-pentyl, n-hexyl, n-heptyl, n-octyl, n-nonyl, and n-decyl. Examples of branched alkyls for groups R of the dialkylaluminum hydride include radicals of the formula —$CH_2CR^1R^2R^3$ where $R^1$, $R^2$, and $R_3$ are independently a ($C_1$-$C_5$)alkyl or hydrogen, provided at least one of $R^1$, $R^2$, and $R^3$ is ($C_1$-$C_5$)alkyl. Non-limiting examples of such groups include 2,2-dimethylpropyl (neopentyl) and 3,3-dimethylbutyl (neohexyl). Further examples of branched alkyls for groups R of the dialkylaluminum hydride include radicals of the formula —$CH(R^1)$—$CH(R^2)(R^3)$, in which one of $R^1$ and $R^2$ is hydrogen and the other of $R^1$ and $R^2$ is a straight-chain or branched ($C_4$-$C_{15}$)alkyl, and $R^3$ is a straight-chain or branched ($C_4$-$C_{15}$)alkyl. Non-limiting examples of such groups include 1-methylpropyl (sec-butyl), 2-methylpropyl (isobutyl), 1-methylbutyl (sec-amyl), 2-methylbutyl, 1-methylpentyl, and 2-methylpentyl.

In a specific non-limiting embodiment, each R is isobutyl. In such embodiments, the groups R of the dialkylaluminum hydride and also the groups R of the Lewis aluminum single sites of structure (B-I) of the modified crystalline zeolite material are isobutyl.

According to some embodiments, the reaction of the dialkylaluminum hydride with the zeolite framework results in attachment of the aluminum atom and one alkyl group R of the dialkylaluminum hydride to the zeolite framework, with loss of a hydrocarbon compound RH as a byproduct. For example, when the dialkylaluminum hydride is diisobutylaluminum hydride, an isobutyl aluminum species attaches to the zeolite framework and a molecule of gaseous isobutane is produced.

According to some embodiments, when the dialkylaluminum hydride reacts with the zeolite framework the Brønsted aluminum sites of the crystalline zeolite material do not react with the dialkylaluminum hydride. In some embodiments, the crystalline zeolite material may be an aluminosilicate zeolite. When the crystalline zeolite material is an aluminosilicate zeolite, the dialkylaluminum hydride may react selectively with silanol groups of the aluminosilicate zeolite and not react with the Brønsted aluminum sites of the crystalline zeolite material.

In some embodiments, the methods for incorporating tetra-coordinate Lewis aluminum single sites into the crystalline zeolite material may further include dehydroxylating the crystalline zeolite material before contacting the crystalline zeolite material with the dialkylaluminum hydride. Dehydroxylating the crystalline zeolite material may include heating the crystalline zeolite material at a temperature of at least 600° C., optionally under vacuum or flowing gas, for a dehydroxylation time sufficient to remove residual water from pores of the zeolite and to generate isolated silanol while eliminating or preventing vicinal silanol species. In example embodiments, the dehydroxylation time may be at least 10 hours. The dehydroxylation is believed to enable the formation of isolated tetra-coordinate aluminum by optimizing the number of available functional species in the crystalline zeolite material that are reactive toward the dialkylaluminum hydride.

In embodiments, the reaction of the dialkylaluminum hydride with the zeolite framework may increase the mass percent of aluminum in the zeolite framework by at least 0.01%, by at least 0.02%, by at least 0.05%, by at least 0.1%, by at least 0.2%, by at least 0.5%, by at least 1%, by at least 2%, by at least 5%, or by at least 10% relative to the mass percent of aluminum in the crystalline zeolite material before the reaction. The increases in mass percent of aluminum in this regard is calculated by dividing the difference in mass percent aluminum in the alkyl-aluminum zeolite and the mass percent aluminum in the crystalline zeolite material before the reaction with the dialkylaluminum hydride by the mass percent aluminum in the crystalline zeolite material before the reaction with the dialkylaluminum hydride and multiplying by 100. The mass percentages of aluminum in the zeolites before and after the reactions are calculated on an oxide basis. In embodiments, in the alkyl-aluminum zeolite, from 0.01% to 50%, or from 0.01% to 10%, or from 0.01% to 5%, or from 0.01% to 2%, or from 0.01% to 1% of all aluminum atoms in the alkyl-aluminum zeolite may be present in the zeolite framework as tetra-coordinate alkyl-aluminum single sites.

The alkyl-aluminum zeolite prepared according to embodiments may exhibit a band as measured by Fourier Transform Infrared Spectroscopy (FTIR) that is characteristic of aluminum-alkyl bonds of the tetra-coordinate alkyl aluminum single sites. In embodiments, the band that is characteristic of aluminum-alkyl bonds of the tetra-coordinate alkyl aluminum single sites may appear in the FTIR spectrum in the range 2850 cm$^{-1}$ to 2990 cm$^{-1}$. Without intent to be bound by theory, it is believed that the wavenumber range of the characteristic peak for the aluminum-alkyl bonds of the tetra-coordinate alkyl aluminum single sites is not dependent on the identity of the alkyl group R and, thus, may be relied upon as indicating the presence of any kind of alkyl aluminum site according to the structure (B-I) as previously defined.

The methods for incorporating tetra-coordinate Lewis aluminum single sites into the crystalline zeolite material may further include converting all or a portion of the alkyl aluminum sites of the alkyl-aluminum zeolite to aluminum hydride sites, thereby forming a modified crystalline zeolite material that is a hydride-aluminum zeolite. The converting of the alkyl-aluminum sites to aluminum hydride sites may include thermally treating or heating the alkyl-aluminum zeolite to induce beta-hydride elimination of at least a portion of the alkyl groups R. Upon the beta-hydride elimination of at least a portion of the alkyl groups R from the sites having according to structure (B-I), tetra-coordinate aluminum hydride single sites are formed that have an environment in the zeolite framework according to structure (B-II):

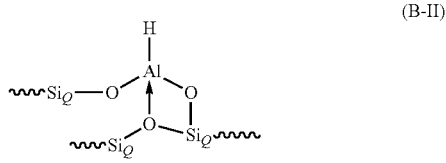

(B-II)

In structure (B-II), each Si$_Q$ is a silicon atom of the zeolite framework that is bonded to four oxygen atoms.

The thermal treatment of the alkyl-aluminum zeolite may be performed by heating the alkyl-aluminum zeolite at a peak treatment temperature from 200° C. to 500° C., or from 300° C. to 500° C., or from 300° C. to 450° C., or from 350° C. to 450° C., or about 400° C., for example. The peak treatment temperature may be reached by heating the alkyl-aluminum zeolite from ambient conditions with a ramp rate from 1° C. to 20° C. and holding at peak temperature for a hold time of from 10 minutes to 6 hours, for example, for a desired time or until the beta-hydride elimination reactions have completed. In some embodiments, a lower peak temperature or a shorter heating time may result in a modified crystalline zeolite material that includes both aluminum hydride sites and alkyl-aluminum sites. The peak treatment temperature must be sufficiently high to initiate the beta-hydride eliminations but sufficiently low to avoid rearrangements to the zeolite framework such as loss of the Lewis aluminum sites or rejection of framework aluminum from the zeolite framework. In embodiments, the heating may be conducted in any suitable reactor under vacuum conditions.

In embodiments, in the hydride-aluminum zeolite, at least 0.01%, or at least 0.1%, or at least 1%, or at least 10%, or from 0.01% to 50%, or from 0.01% to 10%, or from 0.01% to 5%, or from 0.01% to 2%, or from 0.01% to 1% of all aluminum atoms in the hydride-aluminum zeolite may be present in the zeolite framework as tetra-coordinate aluminum hydride single sites.

The hydride-aluminum zeolite prepared according to embodiments may exhibit a band as measured by FTIR that is characteristic of aluminum-hydride bonds of the tetra-coordinate aluminum hydride single sites. In embodiments, the band that is characteristic of aluminum-hydride bonds of the tetra-coordinate aluminum hydride single sites may appear in the FTIR spectrum at approximately 1952 cm$^{-1}$.

The methods for incorporating tetra-coordinate Lewis aluminum single sites into the crystalline zeolite material may further include converting all or a portion of the aluminum hydride sites of the hydride-aluminum zeolite to hydroxyl aluminum sites, thereby forming a modified crystalline zeolite material that is a hydroxyl-aluminum zeolite. The converting of the aluminum hydride sites to aluminum hydroxide sites may include oxidizing the hydride-aluminum zeolite. The tetra-coordinate aluminum hydroxide single sites have an environment in the zeolite framework according to structure (B-III):

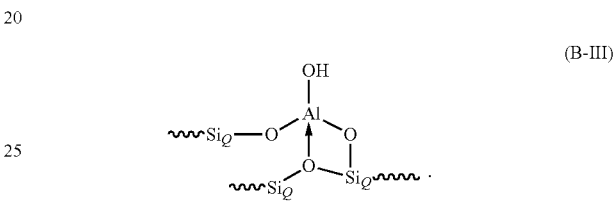

(B-III)

In structure (B-III), each Si$_Q$ is a silicon atom of the zeolite framework that is bonded to four oxygen atoms.

The oxidation may be conducted in the presence of any oxidizing gas or oxidizing liquid having oxidizing ability sufficient to oxidize the aluminum hydride sites to aluminum hydroxide sites. In non-limiting example embodiments, the oxidizing gas may include nitrous oxide (N$_2$O), oxygen, iodosobenzene (PhIO), or a mixture of nitrous oxide and oxygen. Examples of oxidizing liquids may include peroxides. The oxidation may be performed at elevated temperature such as from 70° C. to 200° C., or from 90° C. to 150° C., or about 100° C., for a sufficient time to ensure that the oxidation continues to a desired state of completion. The oxidation time may be from 10 minutes to 5 days or from 1 hour to 5 days, or from 24 hours to 5 days, or about 2 days. In some embodiments, a lower oxidation temperature, a weaker oxidizing gas, or a shorter oxidizing heating time may result in a modified crystalline zeolite material that includes both aluminum hydroxide sites and aluminum hydride sites. In some embodiments, after the oxidation, the modified crystalline zeolite material may include alkyl-aluminum sites, aluminum hydride sites, and aluminum hydroxide sites. It is contemplated that a variety of such sites in a single zeolite framework may give rise to an ability to tune and optimize the zeolite properties to a desired catalyst process in terms of catalyst selectivity, catalyst activity, or both.

In embodiments, in the hydroxyl-aluminum zeolite, at least 0.01%, or at least 0.1%, or at least 1%, or at least 10%, or from 0.01% to 50%, or from 0.01% to 10%, or from 0.01% to 5%, or from 0.01% to 2%, or from 0.01% to 1% of all aluminum atoms in the hydroxyl-aluminum zeolite may be present in the zeolite framework as tetra-coordinate aluminum hydroxide single sites.

The alkyl-aluminum zeolite prepared according to embodiments may exhibit a band as measured by FTIR that is characteristic of aluminum-hydroxyl bonds of the tetra-coordinate aluminum hydroxide single sites. In embodiments, the band that is characteristic of aluminum-hydroxyl bonds of the tetra-coordinate alkyl aluminum single sites may appear in the FTIR spectrum at approximately 3787 $cm^{-1}$.

EXAMPLES

Certain embodiments of this disclosure will be better understood by reference to the following examples, which are offered by way of illustration and which one skilled in the art will recognize are not meant to be limiting.

Example 1

Preparation of Alkyl-Aluminum Zeolite

In this Example, a fibrous hierarchical ZSM-5 (FH-ZSM-5) aluminosilicate zeolite is functionalized to include tetra-coordinate alkyl aluminum single sites. As-provided FH-ZSM-5 was characterized by Energy Dispersive X-ray (EDX) analysis and Transmission Electron Microscopy (TEM). The EDX spectrum of the as-provided FH-ZSM-5 is provided in FIG. 1. Four TEM micrographs of various portions of the as-provided FH-ZSM-5 are provided as FIGS. 2A-2D.

Figure 3:
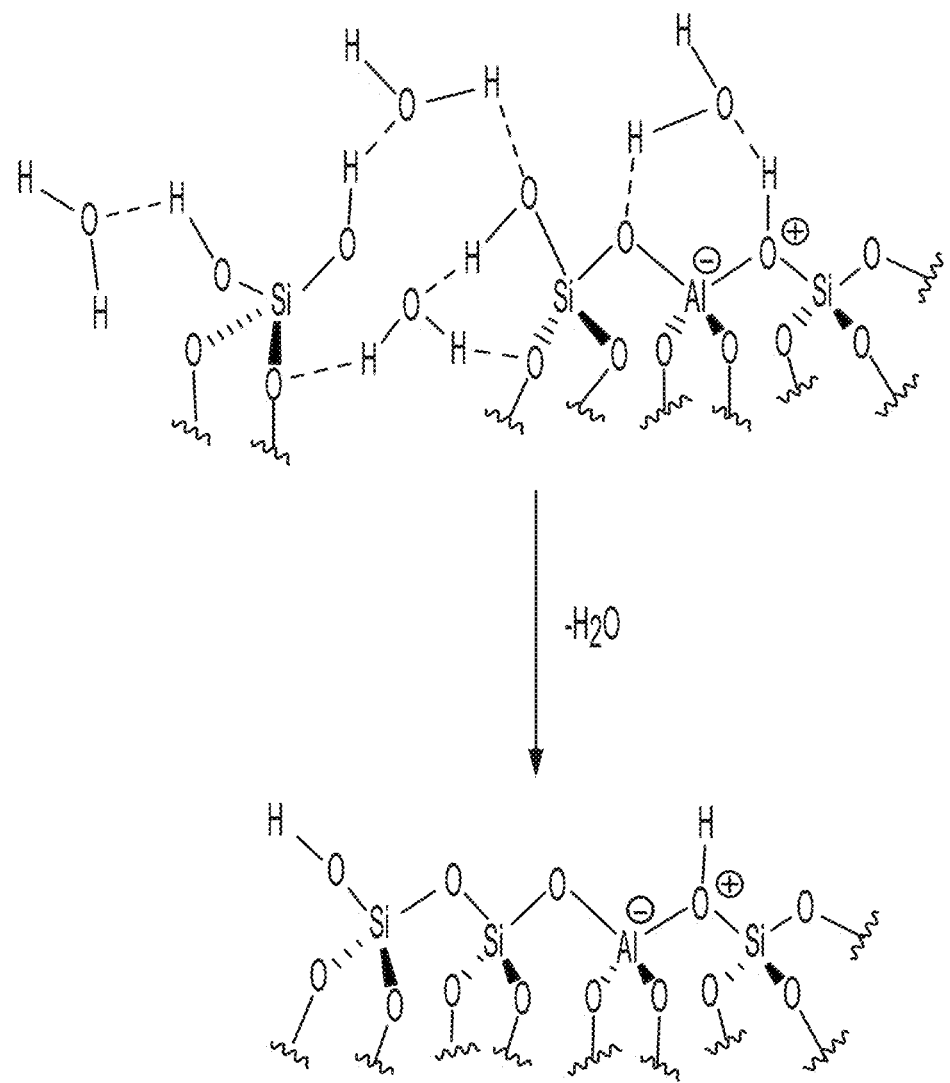
FIG. 3 illustrates an exemplary dehydroxylation reaction of a portion of an aluminosilicate zeolite.

Before the alkylation, the FH-ZSM-5 was dehydroxylated at 700° C. at $10^{-5}$ mbar for 30 hours. An aspect of the dehydroxylation reaction is schematically illustrated in FIG. 3. The reaction scheme of FIG. 3 illustrates a portion of fresh FH-ZSM-5 starting material and a portion of dehydroxylated material as the product. During the dehydroxylation reaction, silanol hydroxyl groups and aluminum-oxygen-silicon bridged protons are removed as molecules of water to form reaction sites on the aluminosilicate framework.

Figure 4:
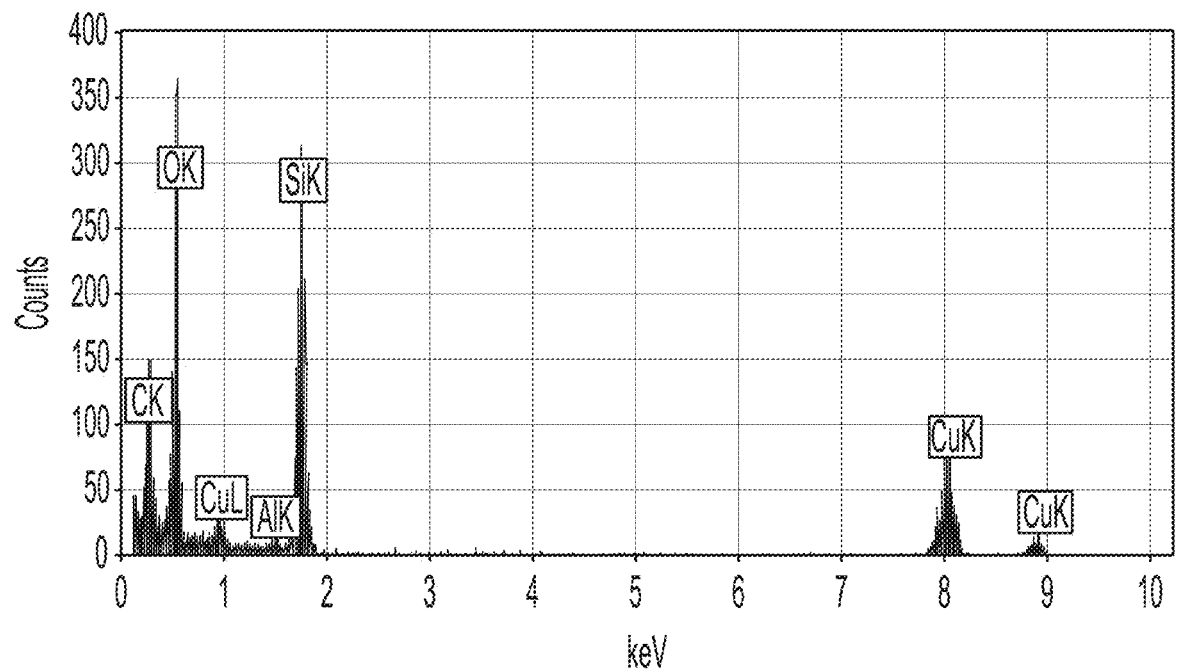
FIG. 4 is an EDX spectrum of H-ZSM-5 zeolite after dehydroxylation.
Figure 5:
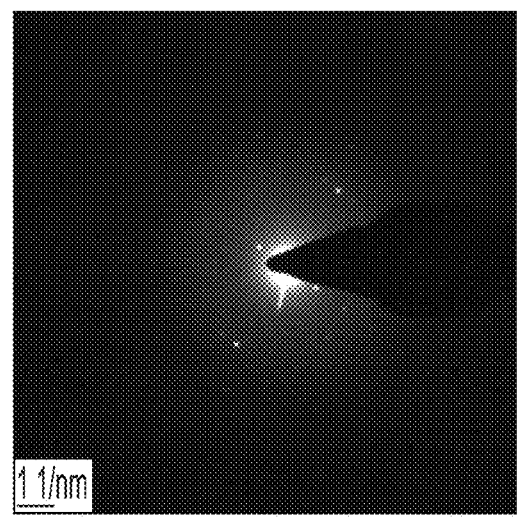
FIG. 5 is a Selected Area Electron Diffraction (SAED) pattern of the H-ZSM-5 zeolite after dehydroxylation.
Figure 6A:
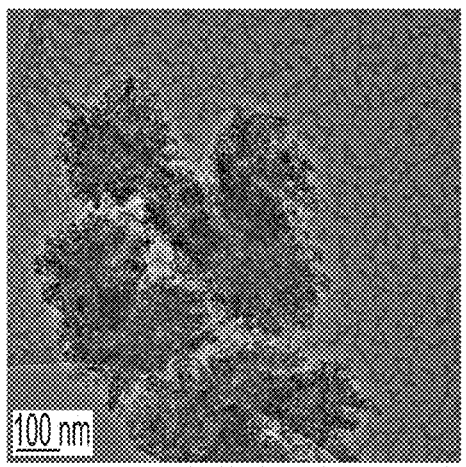
FIGS. 6A-6D are micrographs of H-ZSM-5 zeolite after dehydroxylation acquired by TEM.
Figure 6B:
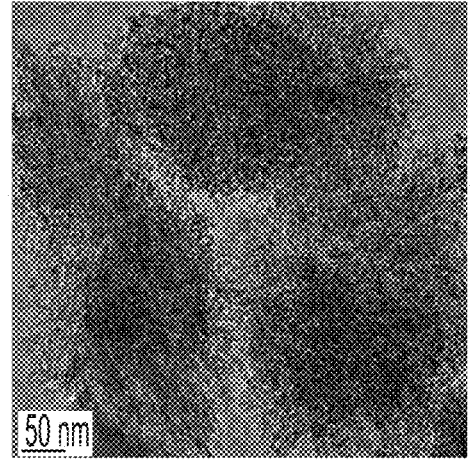
Figure 6C:
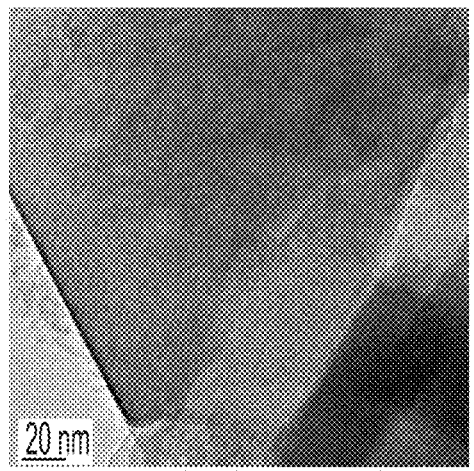
Figure 6D:
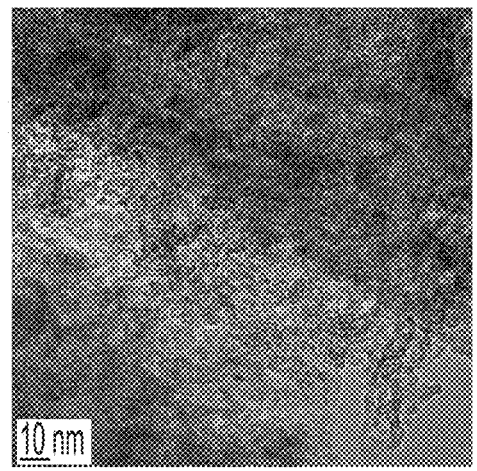

The dehydroxylated FH-ZSM-5 was characterized by EDX analysis, Selected Area Electron Diffraction (SAED), TEM, and Fourier Transform Infrared (FTIR) spectroscopy. The EDX spectrum of the dehydroxylated H-ZSM-5 is provided in FIG. 4. The SAED pattern of the dehydroxylated H-ZSM-5 is provided in FIG. 5. Four TEM micrographs of various portions of the dehydroxylated FH-ZSM-5 are provided as FIGS. 6A-6D.

Figure 7:
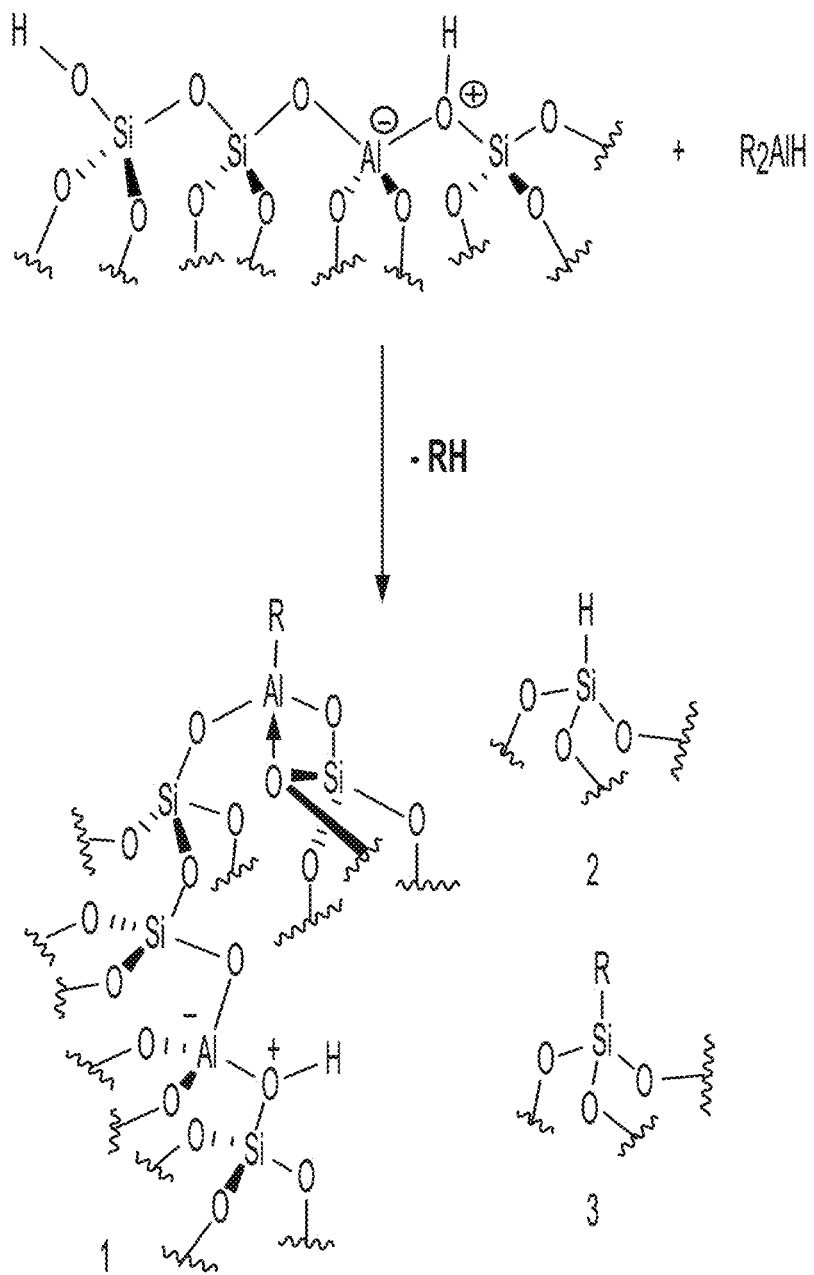
FIG. 7 is an exemplary alkylation reaction of dehydroxylated aluminosilicate zeolite.

An aspect of the alkylation reaction is schematically illustrated in FIG. 7. As illustrated in the schematic of FIG. 7, upon reaction of dehydroxylated material with dialkyl-aluminum hydride ($R_2AlH$), alkyl aluminum sites are incorporated into the zeolite framework. In the present example, R of the dialkylaluminum hydride was isobutyl, and the dialkylaluminum hydride was di-isobutyl aluminum hydride (DIBAL). A molecule of isobutane was liberated during the reaction for every Al—R site that was formed.

The alkylation reaction was performed under an inert atmosphere. Into a first compartment of a double Schlenk tube, 0.5 g of dehydroxylated H-ZSM-5 was introduced. Into the second compartment of the double Schlenk tube, 3 mL of dry and degassed pentane and one equivalent of diisobutylaluminum hydride (DIBAL-H) in 1.0 M in hexane (calculated with respect to the amount of silanol present after dehydroxyaltion) were stirred at room temperature over 5 minutes. The transfer of the solution of DIBAL-H to the H-ZSM-5 was performed in liquid nitrogen. The reaction was maintained at room temperature under stirring for one hour. The volatiles were removed by filtration, and the white solid was washed twice with dry pentane to eliminate unreacted DIBAL-H. The resulting solid was dried for 12 hours under dynamic vacuum ($10^{-5}$ mbar).

Figure 8:
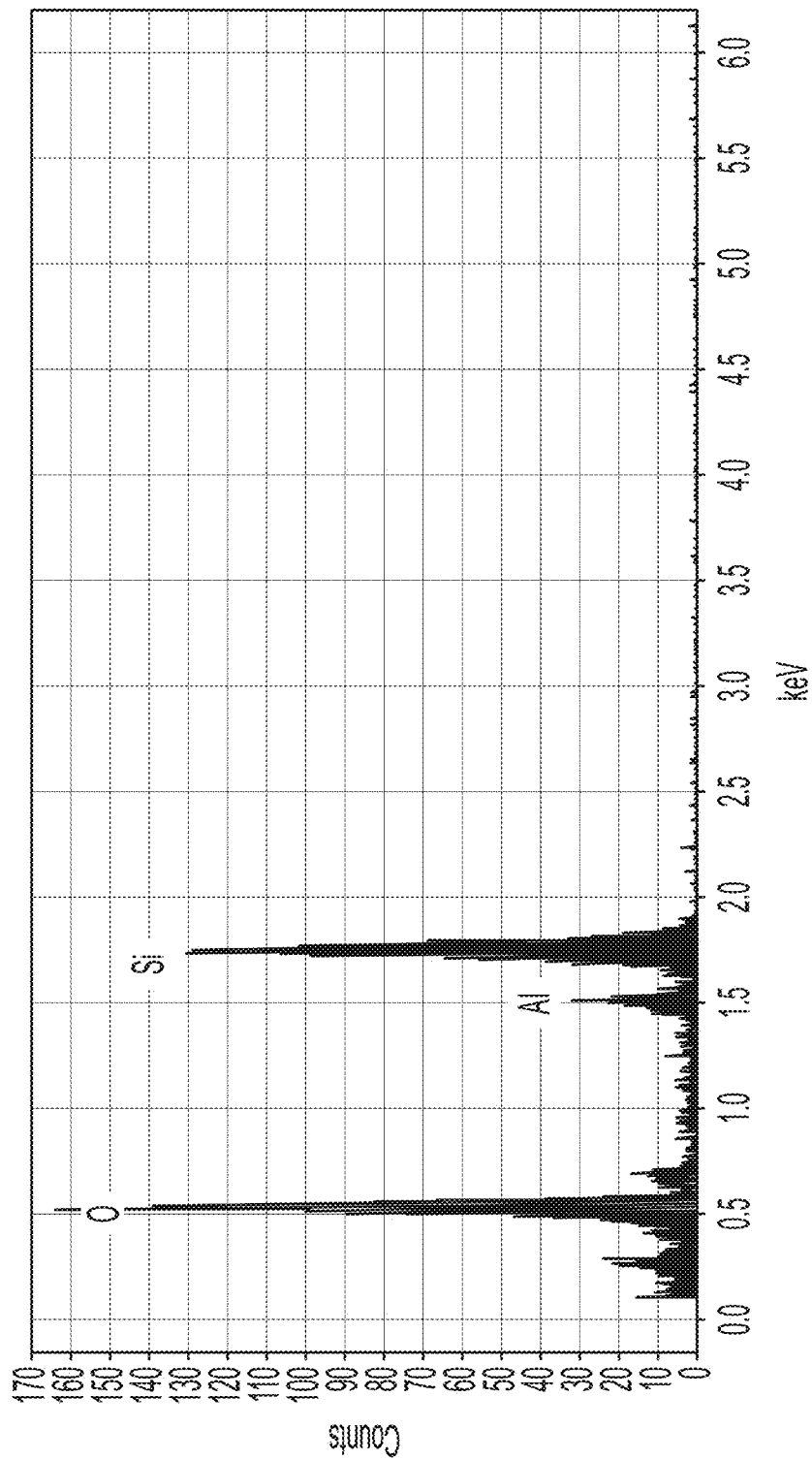
FIG. 8 is an EDX spectrum of an alkyl-aluminum zeolite prepared by reaction of dehydroxylated H-ZSM-5 with diisobutyl aluminum (DIBAL).
Figure 9:
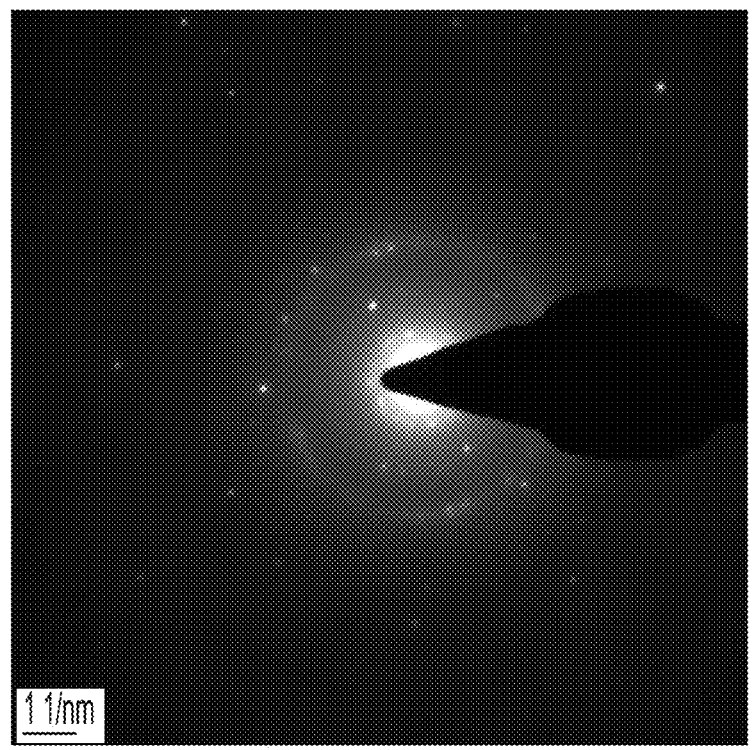
FIG. 9 is a SAED pattern of the alkyl-aluminum zeolite prepared by reaction of dehydroxylated H-ZSM-5 with DIBAL.
Figure 10A:
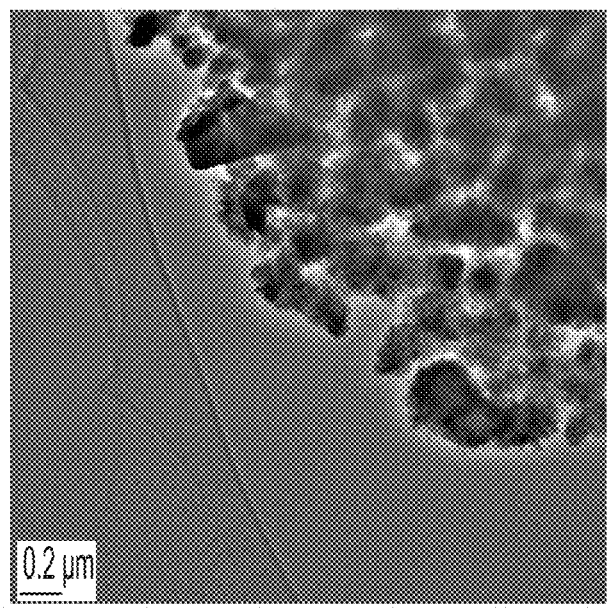
FIGS. 10A and 10B are micrographs of the alkyl-aluminum zeolite prepared by reaction of dehydroxylated H-ZSM-5 with DIBAL acquired by TEM.
Figure 10B:
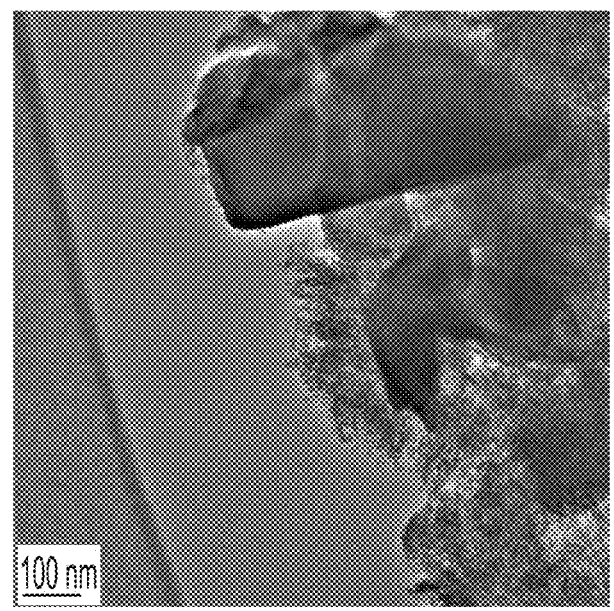

The alkyl-aluminum zeolite, specifically an isobutyl-aluminum zeolite, was analyzed by EDX, SAED, TEM, FTIR, $^{27}Al$ Solid State Nuclear Magnetic Resonance (SS-NMR), and proton ($^1H$) SS-NMR. The EDX spectrum of the isobutyl-aluminum zeolite is provided in FIG. 8. The SAED pattern of the isobutyl-aluminum zeolite is provided in FIG. 9. Two TEM micrographs of various portions of the isobutyl-aluminum zeolite are provided as FIGS. 10A and 10B.

Figure 11:
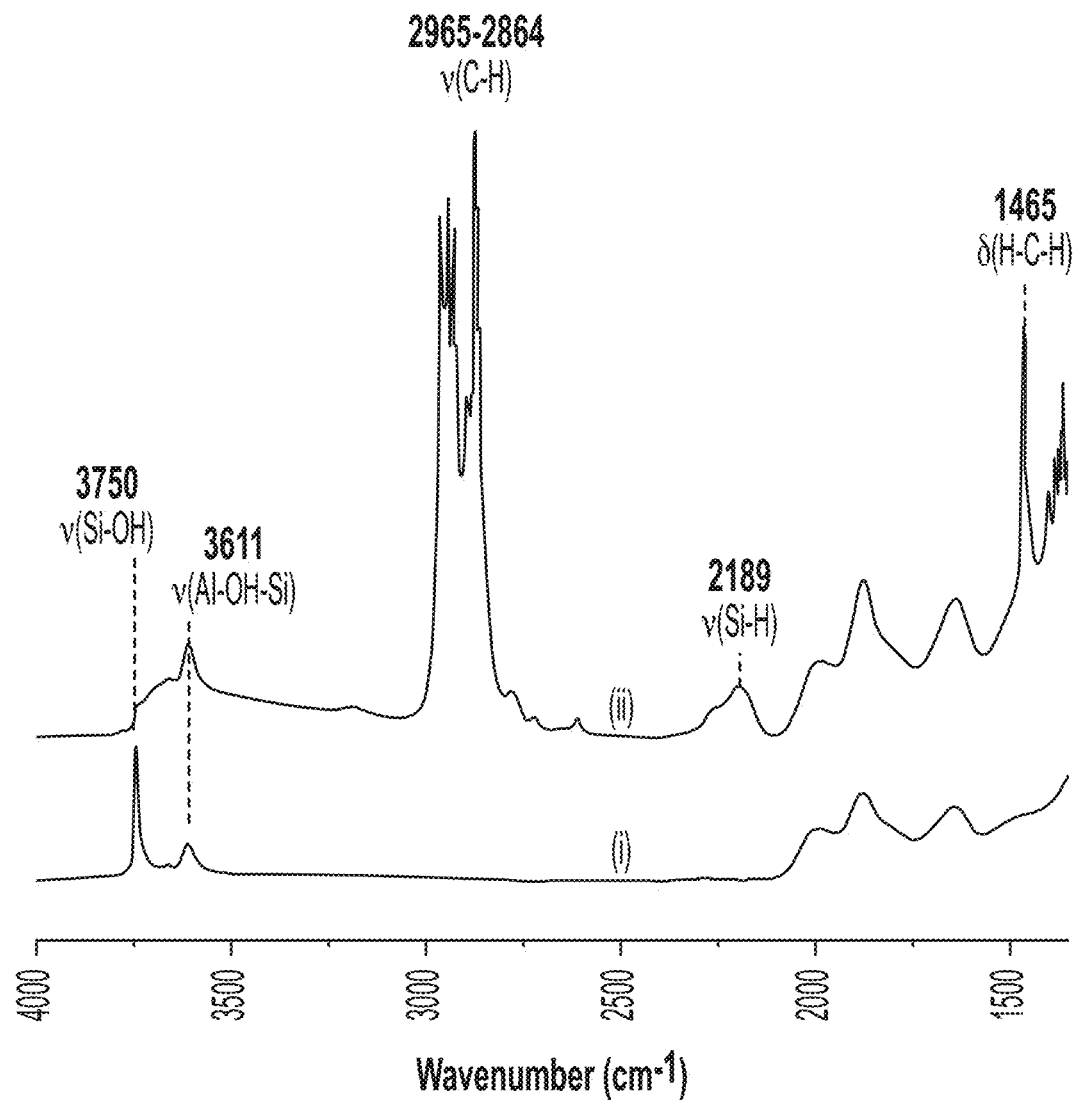
FIG. 11 shows stacked Fourier Transform Infrared (FTIR) spectra of (i) H-ZSM-5 zeolite after dehydroxylation; and (ii) the alkyl-aluminum zeolite prepared by reaction of dehydroxylated H-ZSM-5 with DIBAL.

The stacked FTIR spectra of FIG. 11 illustrate (i) the dehydroxylated FH-ZSM-5 before reaction with DIBAL; and (ii) the isobutyl-aluminum zeolite resulting from reacting the dehydroxylated FH-ZSM-5 with DIBAL. Vibrational isobutyl groups appear in the range 2965-2864 $cm^{-1}$ [$v_{as}(CH_3)$, $v_{as}(CH_2)$], and 1465 $cm^{-1}$ [$\delta_{as}(CH_3)$]. Formation of silicon hydride species characterized by a broad band at 2189 $cm^{-1}$.

The FTIR spectrum of the isobutyl-aluminum zeolite illustrates several aspects of the reaction chemistry. First, the decreased intensity of the peak at 3750 $cm^{-1}$ attributed to Si—OH vibration from the dehydroxylated FH-ZSM-5 to the isobutyl-aluminum zeolite may indicate that the DIBAL reacted substantially with silanol species in the zeolite framework. Unexpectedly, the peak at 3611 $cm^{-1}$ attributed to Al—OH vibration remained after the DIBAL reaction. From this peak retention, it is believed that the DIBAL not only reacted with silanol species but did so selectively, without reacting with Brønsted aluminum sites. Thus, by FTIR the alkyl-aluminum zeolite was determined to include supported isobutyl aluminum species (species 1 in FIG. 7), silyl hydride species (species 2 in FIG. 7), and isobutyl siloxane species (species 3 in FIG. 7).

Figure 22:
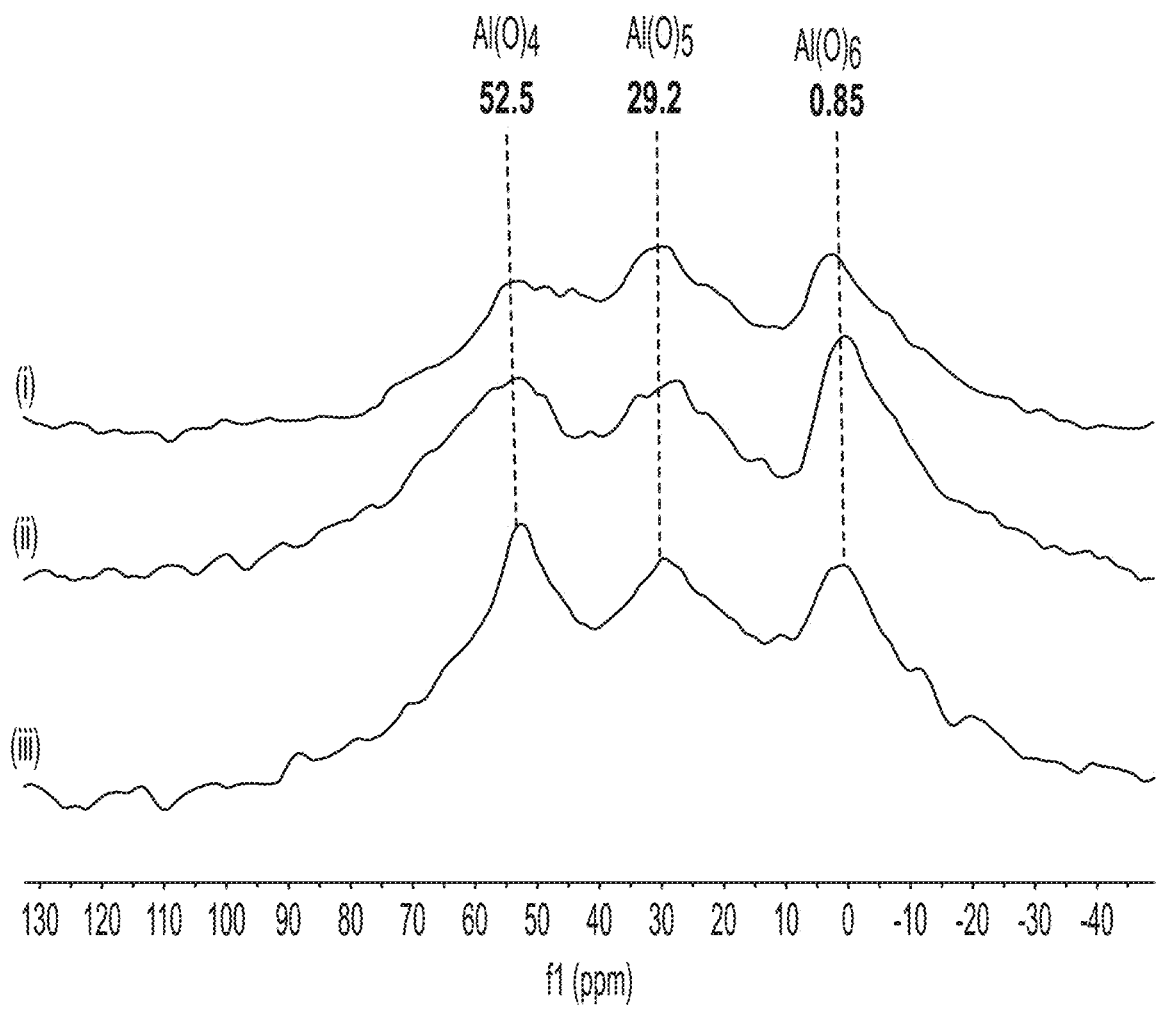
FIG. 22 shows stacked $^{27}$Al Solid State Nuclear Magnetic Resonance ($^{27}$Al SS-NMR) spectra of (i) the alkyl-aluminum zeolite prepared by reaction of dehydroxylated H-ZSM-5 with DIBAL; (ii) the hydride-aluminum zeolite prepared by thermal treatment of the alkyl-aluminum zeolite; and (iii) the hydroxide-aluminum zeolite prepared by oxidizing the hydride-aluminum zeolite.

The $^{27}Al$ SS-NMR spectrum of the alkyl-aluminum is trace (i) of the stacked spectra in FIG. 22. The $^1H$ SS-NMR spectrum of the alkyl-aluminum is trace (i) of the stacked spectra in FIG. 23. The SS-NMR spectra will be discussed comparatively in greater detail in Example 3.

Example 2

Preparation of Hydride-Aluminum Zeolite

An alkyl-aluminum zeolite prepared according to Example 1 was converted to a hydride-aluminum zeolite. An aspect of the hydride formation reaction is schematically illustrated in FIG. 12, whereby, upon heat treatment of the alkyl-aluminum zeolite, various hydride species are formed on the zeolite framework.

Figure 12:
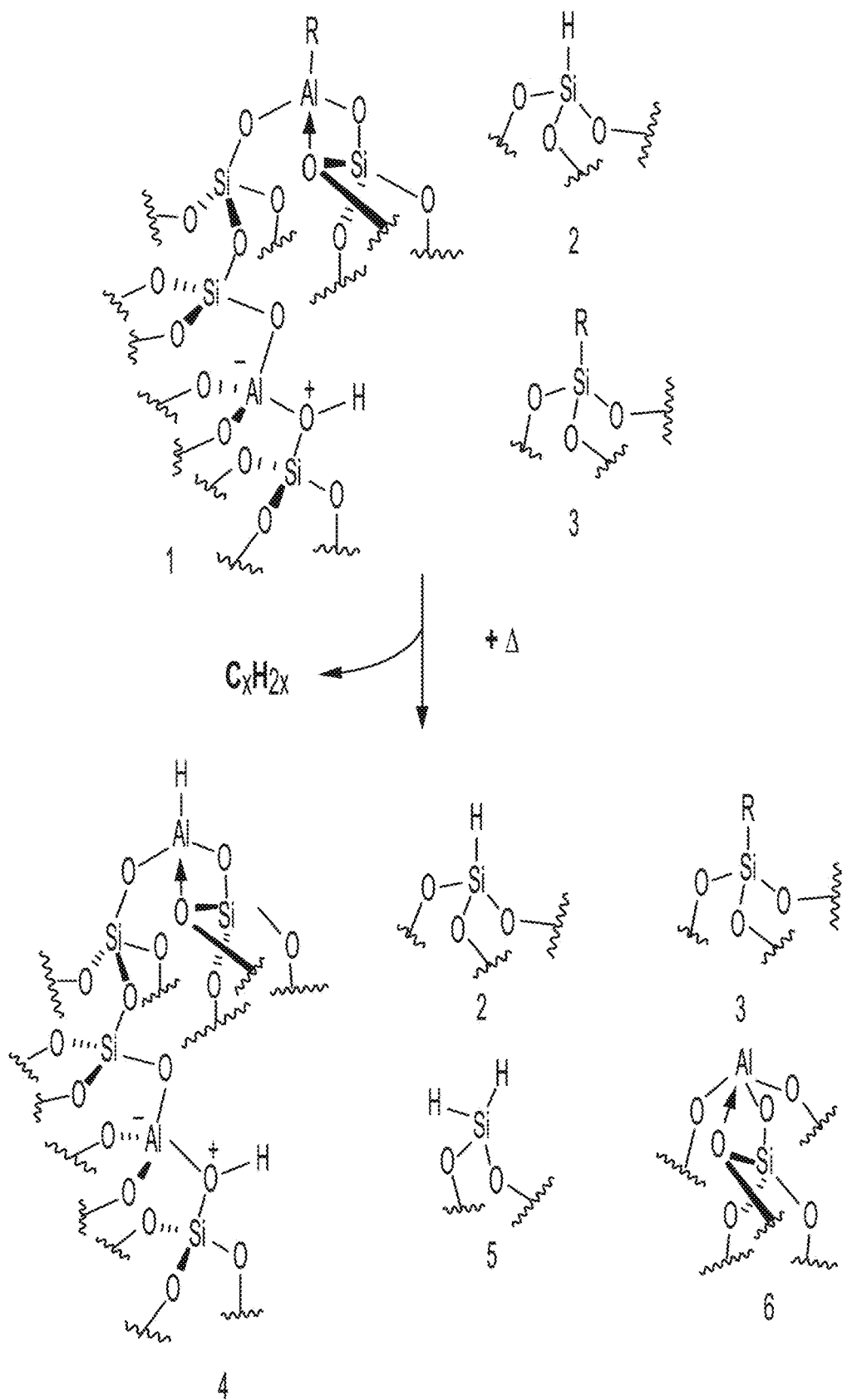
FIG. 12 is an exemplary beta-elimination reaction to form a hydride-aluminum zeolite by thermal treatment of an alkyl-aluminum zeolite.

As described in Example 1, the alkyl-aluminum zeolite as a whole included the three species 1, 2, and 3 as illustrated in FIG. 12, where R was isobutyl. The alkyl-aluminum zeolite of Example 1 was introduced into a glass reactor (275 mL). The reactor was heated to 400° C. from room temperature with a ramp rate of 8° C. per hour and was held at 400° C. for one hour under dynamic vacuum ($10^{-5}$ mbar). The heat treatment under vacuum induced beta-hydride elimination of the isobutyl groups on the zeolite framework with release of an alkene ($C_xH_{2x}$), specifically isobutene (2-methylpropene).

Figure 13:
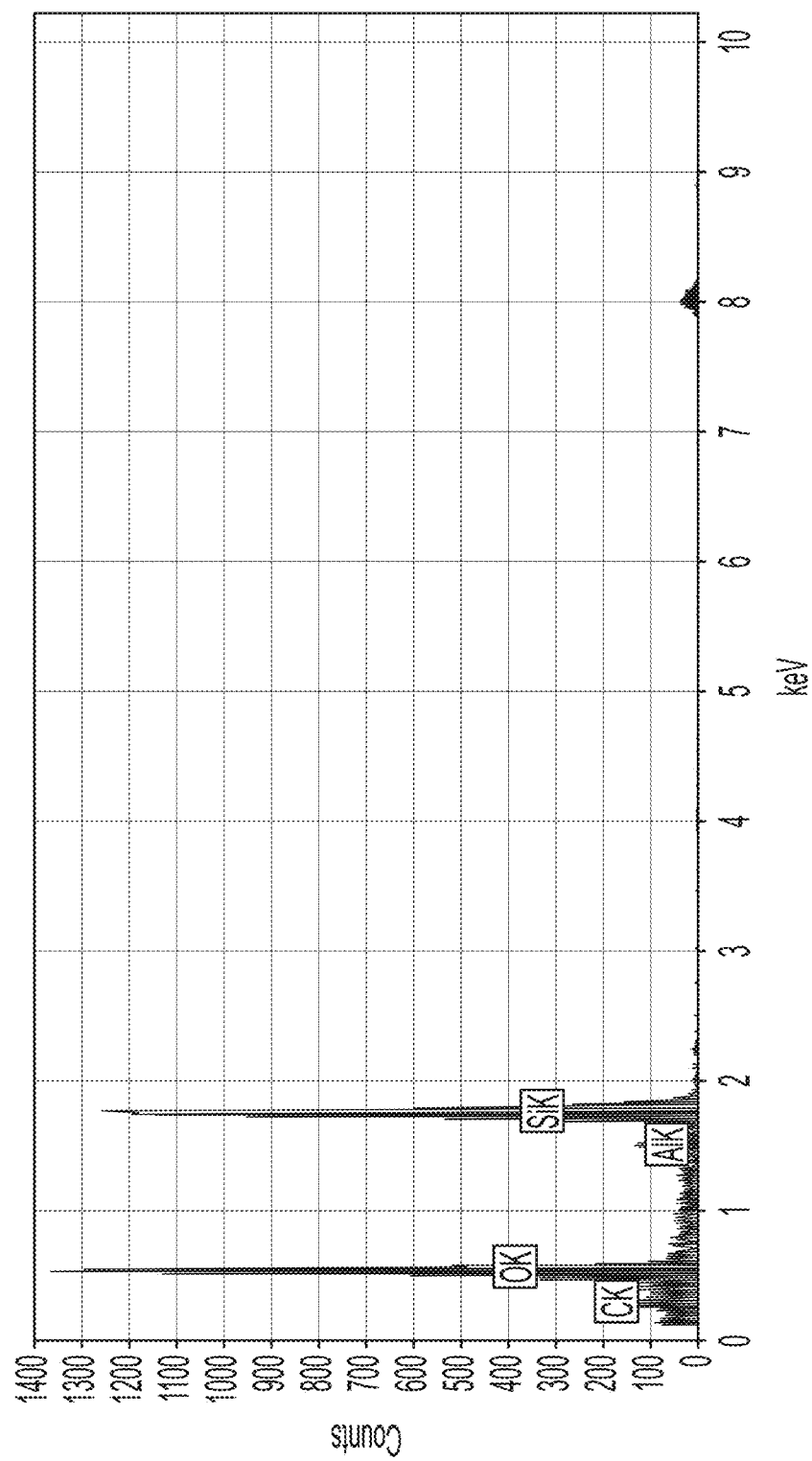
FIG. 13 is an EDX spectrum of a hydride-aluminum zeolite prepared by thermal treatment of an alkyl-aluminum zeolite.
Figure 14:
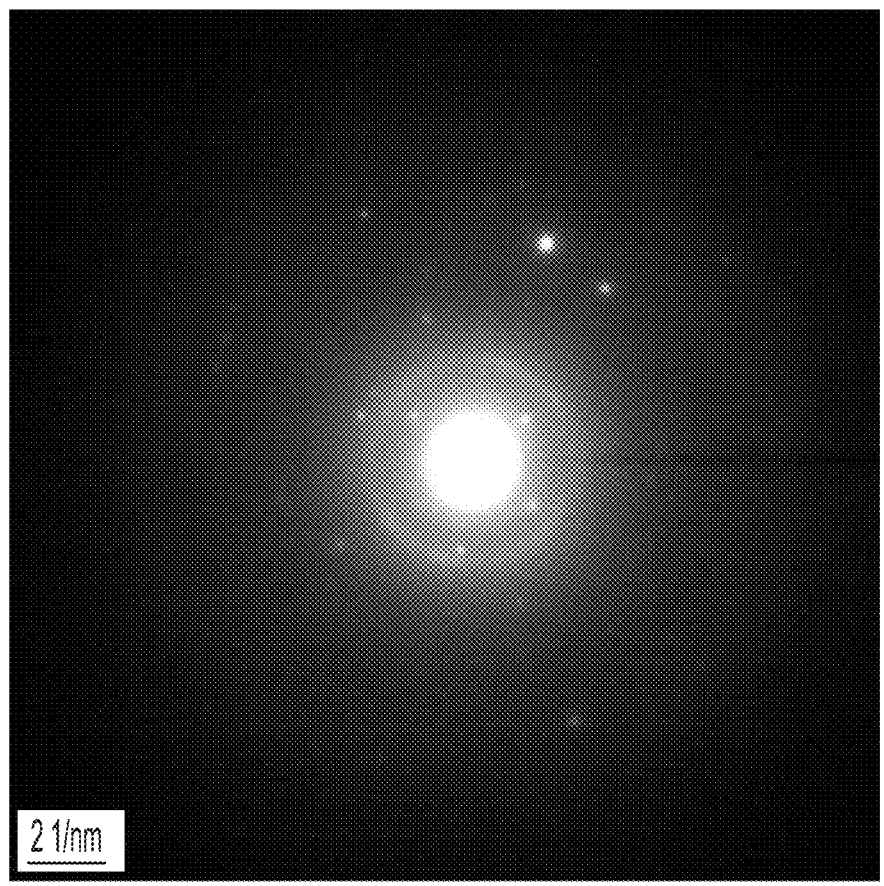
FIG. 14 is a SAED pattern of the hydride-aluminum zeolite prepared by thermal treatment of the alkyl-aluminum zeolite.
Figure 15A:
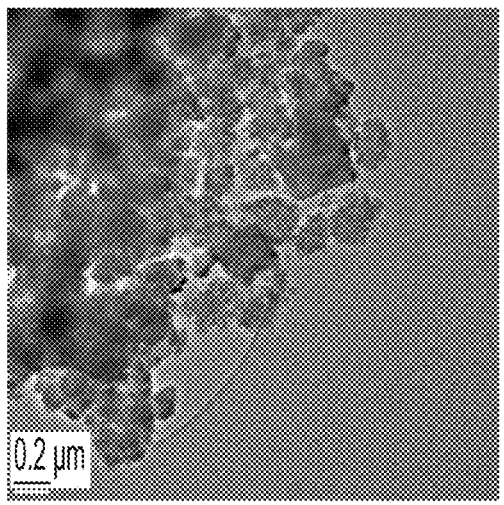
FIGS. 15A-15D are micrographs of the hydride-aluminum zeolite prepared by thermal treatment of the alkyl-aluminum zeolite, acquired by TEM.
Figure 15B:
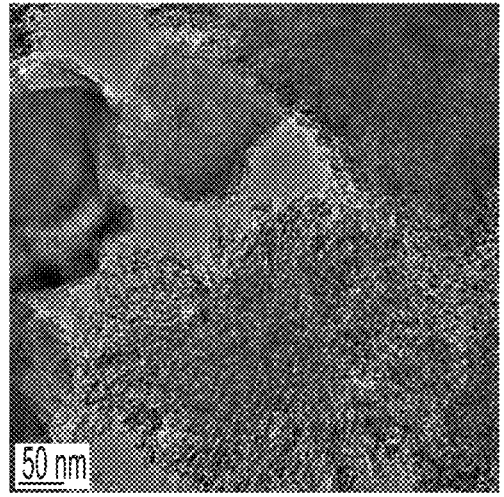
Figure 15C:
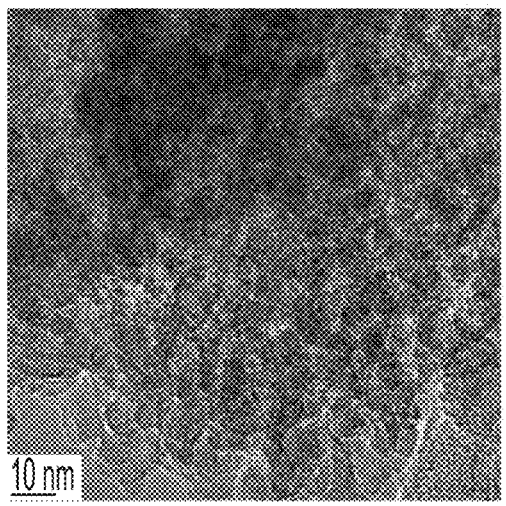
Figure 15D:
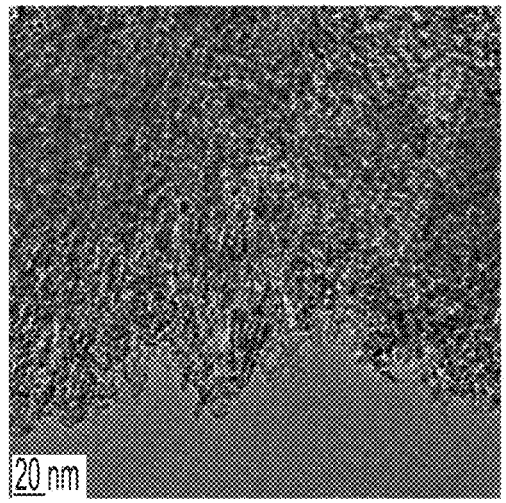

The hydride-aluminum zeolite was analyzed by EDX, SAED, TEM, FTIR, $^{27}Al$ SS-NMR, and $^1H$ SS-NMR. The EDX spectrum of the hydride-aluminum zeolite is provided in FIG. 13. The SAED pattern of the hydride-aluminum zeolite is provided in FIG. 14. Four TEM micrographs of various portions of the hydride-aluminum zeolite are provided as FIGS. 15A-15D.

Figure 16:
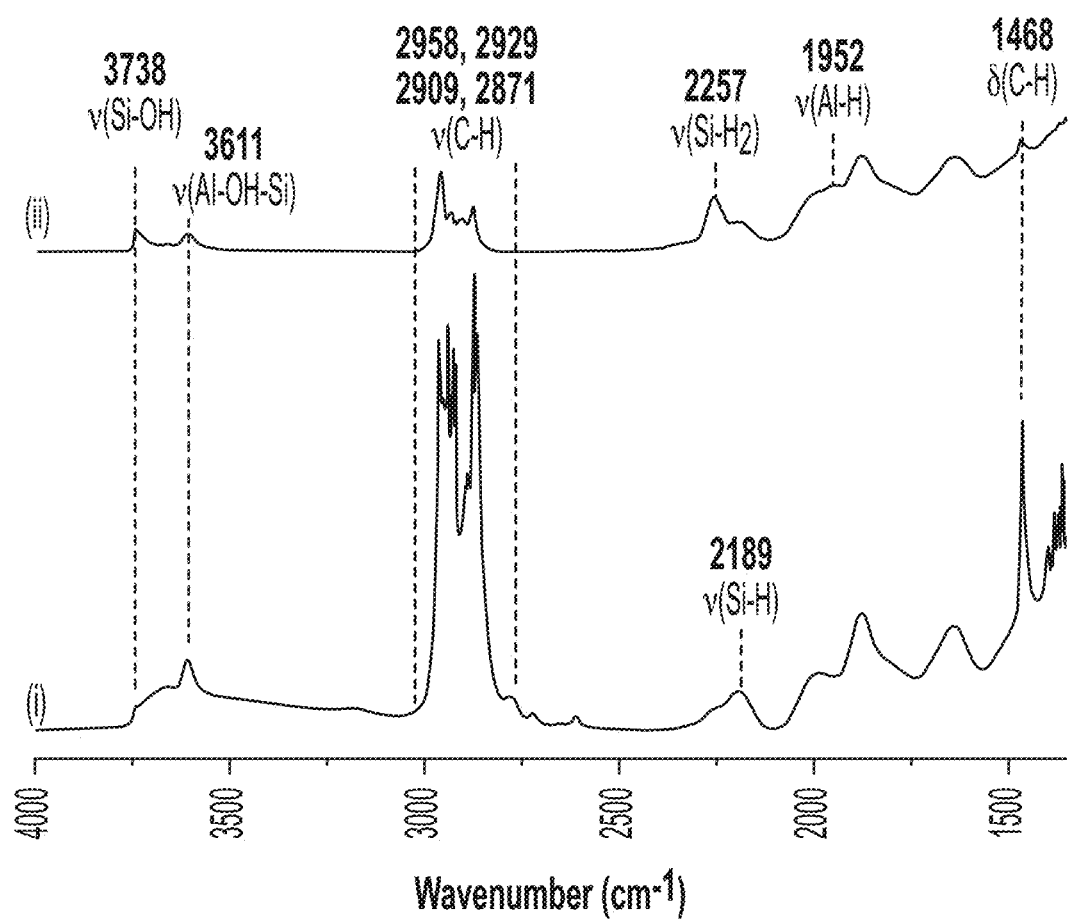
FIG. 16 shows stacked Fourier Transform Infrared (FTIR) spectra of (i) an alkyl-aluminum zeolite prepared by reaction of dehydroxylated H-ZSM-5 with DIBAL; and (ii) the hydride-aluminum zeolite prepared by thermal treatment of the alkyl-aluminum zeolite.

The stacked FTIR spectra of FIG. 16 illustrate (i) the isobutyl-aluminum zeolite resulting from reacting the dehydroxylated FH-ZSM-5 with DIBAL; and (ii) the hydride-aluminum zeolite after thermal treatment of the isobutyl-aluminum zeolite. The FTIR spectrum of the hydride-aluminum zeolite showed a strong decrease of the vibrational bands of isobutyl groups in the range 2958-2871 cm$^{-1}$ [$v_{as}(CH_3)$, $v_s(CH_2)$], and 1468 cm$^{-1}$ [$\delta_{as}(CH_3)$]. A band for Al—H appeared at 1952 cm$^{-1}$ [$v$ (Al—H)].

The FTIR spectrum of the hydride-aluminum zeolite illustrates several aspects of the reaction chemistry. First, the presence of aluminum-hydride bonds [Al—H] was evidenced by a band at 1952 cm$^{-1}$ not present in the alkyl-aluminum zeolite. A band at 3738 cm$^{-1}$ was attributed to silanol species [Si—OH]. A band at 3611 cm$^{-1}$ evidenced the retention and non-reaction of Brønsted aluminum sites during the thermal treatment. A band at 2257 cm$^{-1}$ was attributed to dihydride silyl species. Finally, the peaks at 2958 cm$^{-1}$, 2929 cm$^{-1}$, 2909 cm$^{-1}$, 2871 cm$^{-1}$, and 1468 cm$^{-1}$, all attributed to carbon-hydrogen stretches in the alkyl-aluminum zeolite, were diminished in the hydride-aluminum zeolite relative to the alkyl-aluminum zeolite, evidencing that the isobutyl groups were substantially replaced by hydride following the beta-elimination reaction. It is believed that the retention of the peak at 1468 cm$^{-1}$ indicates the presence of isobutyl siloxane species. Thus, by FTIR, the hydride-aluminum zeolite was determined to include supported aluminum hydride species (species 4 in FIG. 12), silyl hydride species (species 2 in FIG. 12), isobutyl siloxane species (species 3 in FIG. 12), silyl dihydride species (species 5 in FIG. 12), and tetra-oxo-coordinated aluminum species (species 6 in FIG. 12).

The $^{27}$Al SS-NMR spectrum of the hydride-aluminum is trace (ii) of the stacked spectra in FIG. 22. The $^1$H SS-NMR spectrum of the hydride-aluminum is trace (ii) of the stacked spectra in FIG. 23. The SS-NMR spectra of FIGS. 22 and 23 will be discussed comparatively in greater detail in Example 3.

Example 3

Preparation of Hydroxyl-Aluminum Zeolite

Figure 17:
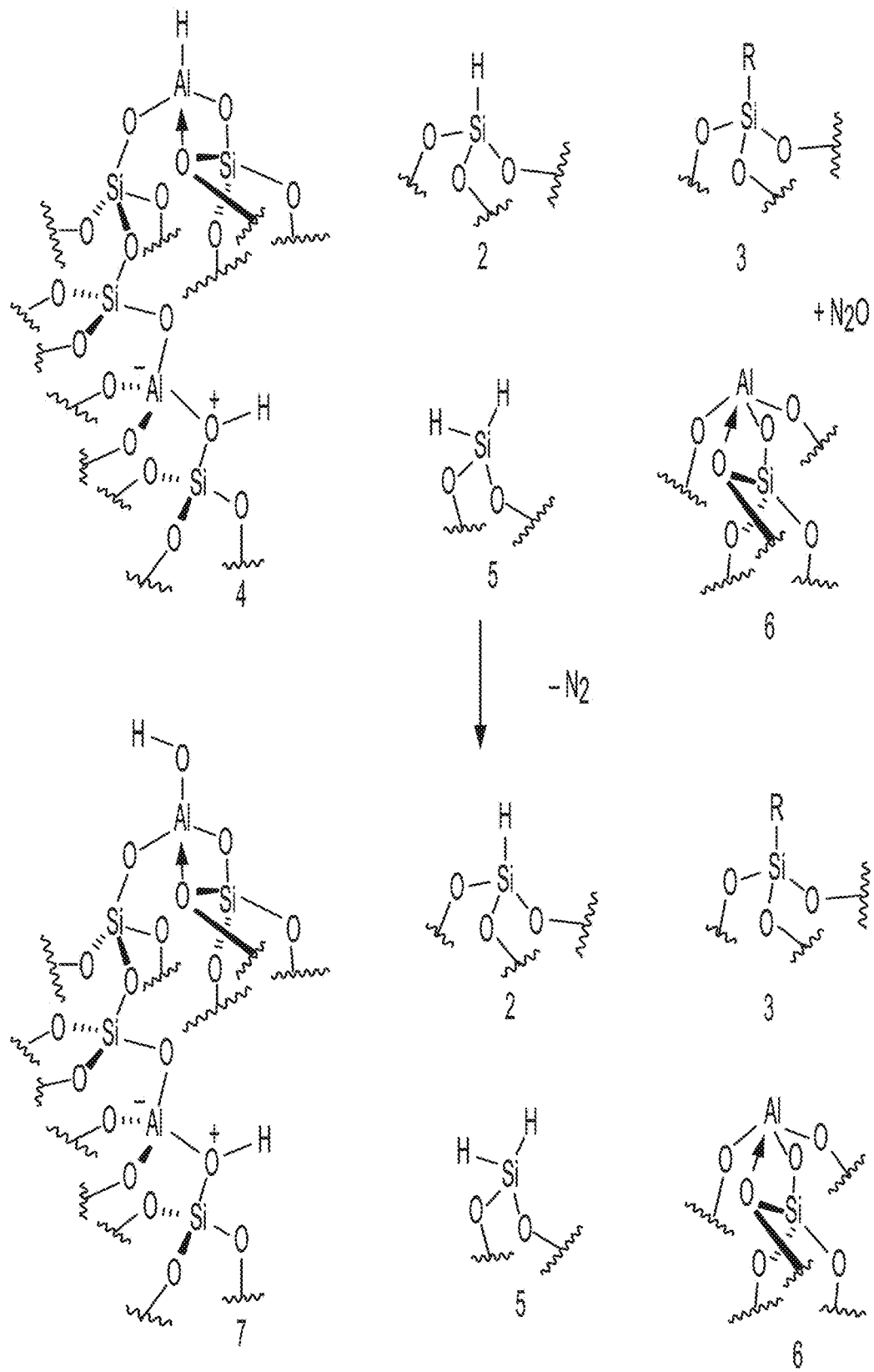
FIG. 17 is an exemplary reaction to form a hydroxide-aluminum zeolite by oxidizing the hydride-aluminum zeolite.

The hydride-aluminum zeolite of Example 2 was converted to a hydroxyl-aluminum zeolite. An aspect of the hydroxyl formation reaction is schematically illustrated in FIG. 17, whereby, upon oxidation of the hydride-aluminum zeolite, aluminum hydride species in the zeolite framework are converted to hydroxyl aluminum species in the zeolite framework.

Figure 18:
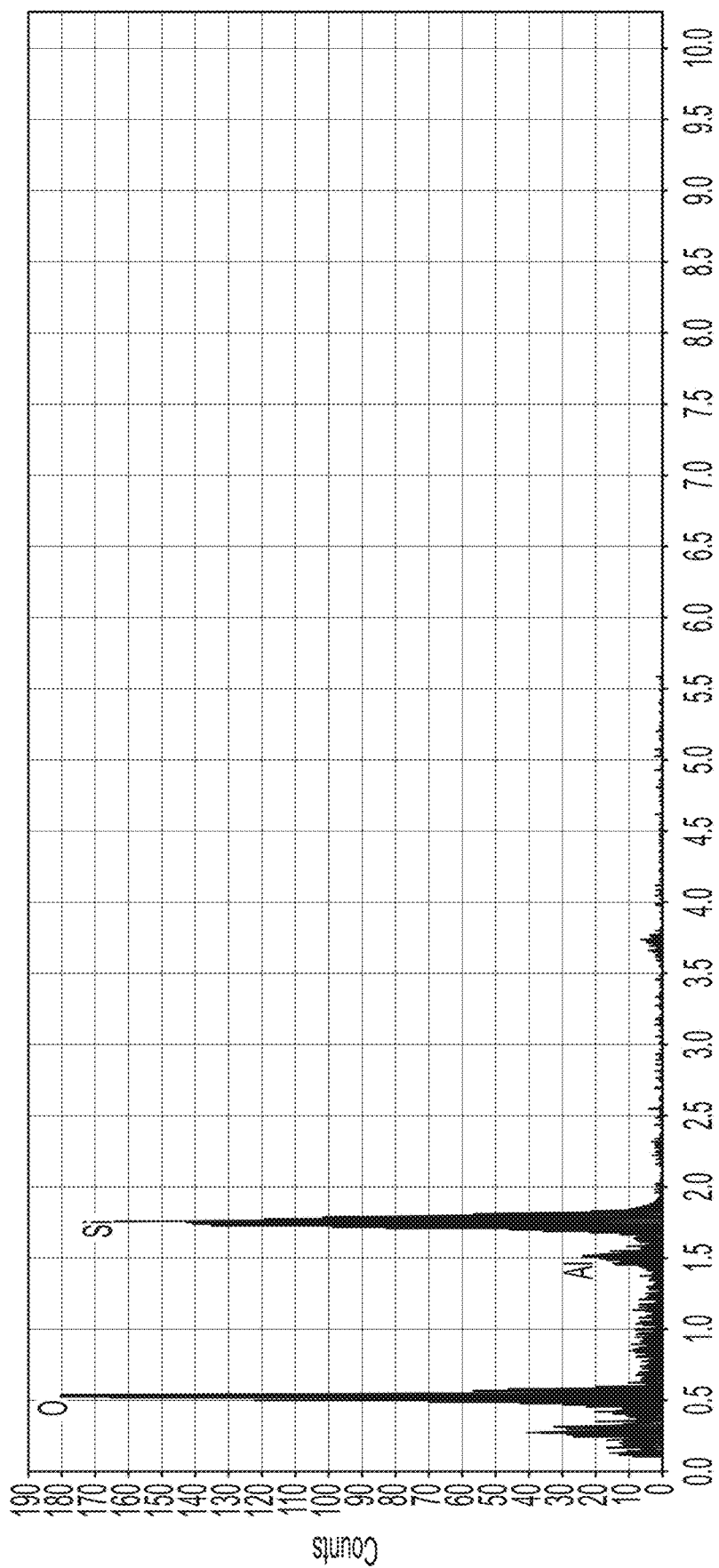
FIG. 18 is an EDX spectrum of a hydroxide-aluminum zeolite prepared by oxidizing the hydride-aluminum zeolite.
Figure 19:
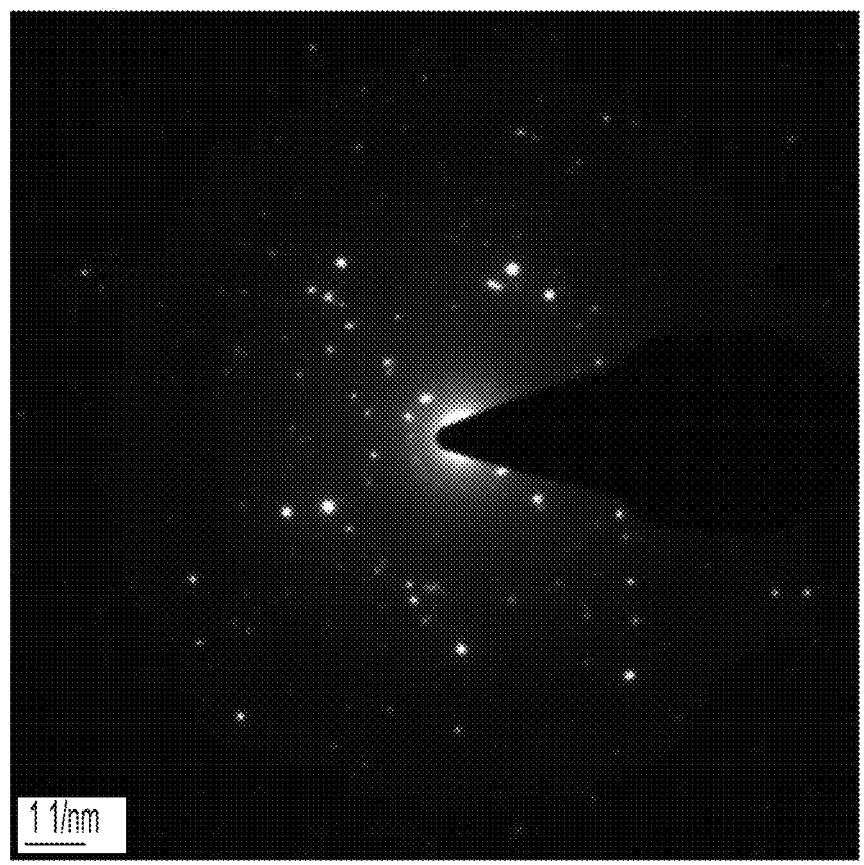
FIG. 19 is a SAED pattern of a hydroxide-aluminum zeolite prepared by oxidizing the hydride-aluminum zeolite.

A hydride-aluminum zeolite prepared according to Examples 1 and 2 was subjected to an oxidation step to oxidize the [Al—H] surface species to form [Al—OH] species. The oxidation was performed by exposing the hydride-aluminum zeolite to N$_2$O (0.7 bar) at 100° C. for 2 days. The oxidized product, a hydroxyl aluminum zeolite, was analyzed by EDX, SAED, TEM, FTIR, $^{27}$Al SS-NMR, and $^1$H SS-NMR. The EDX spectrum of the hydroxyl-aluminum zeolite is provided in FIG. 18. The SAED pattern of the hydroxyl-aluminum zeolite is provided in FIG. 19. Four TEM micrographs of various portions of the hydroxyl-aluminum zeolite are provided as FIGS. 20A-20D.

Figure 21:
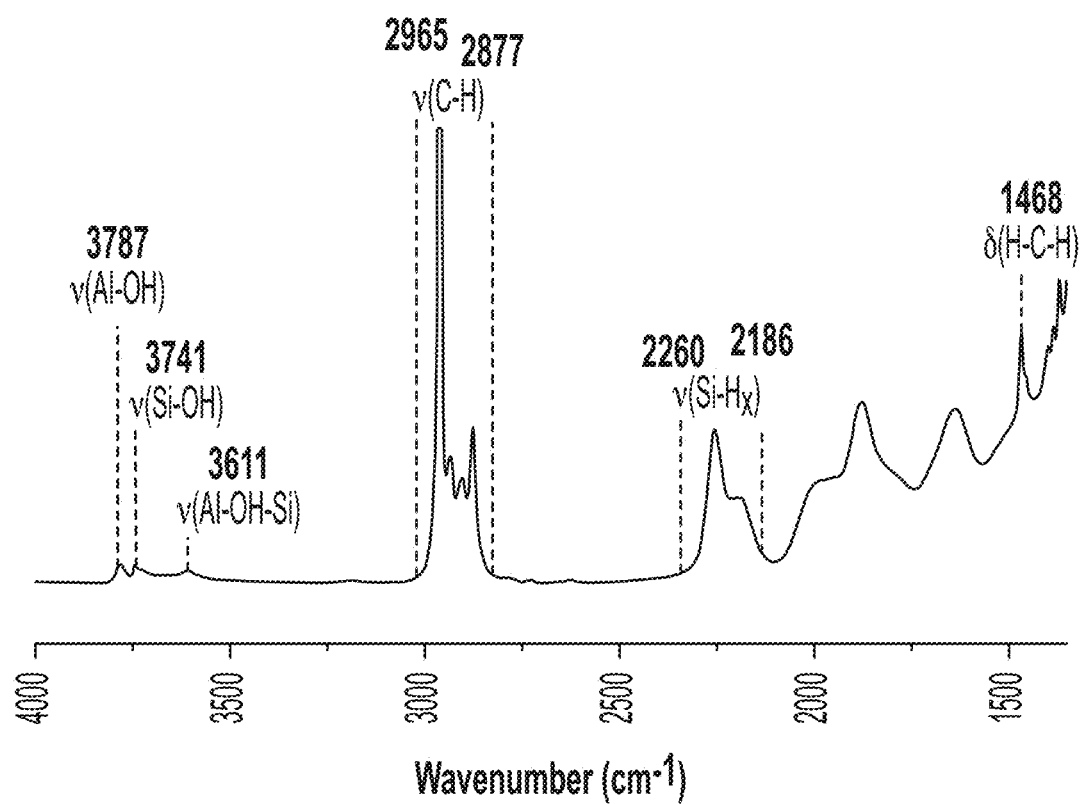
FIG. 21 is an FTIR spectrum of the hydroxide-aluminum zeolite prepared by oxidizing the hydride-aluminum zeolite.

The FTIR spectrum of the hydroxyl-aluminum zeolite is provided as FIG. 21. The spectrum evidences a total conversion of [Al—H] into [Al—OH] as a result of the oxidation treatment in nitrous oxide. Specifically, the band at 1952 cm$^{-1}$ assigned to [Al—H] was no longer present, and a new band appeared at 3787 cm$^{-1}$ representing an [Al—OH] Lewis site in the hydroxyl-aluminum zeolite. A band at 3611 cm$^{-1}$ evidenced the retention and non-reaction of Brønsted aluminum sites during the oxidation. Other prominent bands were at 3741 cm$^{-1}$ for silanol species, and at 2260 cm$^{-1}$ and 2186 cm$^{-1}$ for silyl hydrides. Carbon-hydrogen stretches and vibrations were evident from bands at 2965 cm$^{-1}$, 2877 cm$^{-1}$, and 1468 cm$^{-1}$. Thus, by FTIR, the hydroxyl-aluminum zeolite was determined to include supported aluminum hydroxyl species (species 7 in FIG. 17), silyl hydride species (species 2 in FIG. 17), isobutyl siloxane species (species 3 in FIG. 17), silyl dihydride species (species 5 in FIG. 17), and tetra-oxo-coordinated aluminum species (species 6 in FIG. 17).

The $^{27}$Al SS-NMR spectra of FIG. 22 show the evolution of aluminum environments from (i) the alkyl-aluminum zeolite of Example 1 to (ii) the hydride-aluminum zeolite of Example 2 to (iii) the hydroxyl-aluminum zeolite of the present Example 3. Aluminum atoms influenced by six proximate oxygen atoms [Al(O)$_6$] present a peak at about 0.85 ppm. Aluminum atoms influenced by five proximate oxygen atoms [Al(O)$_5$] present a peak at about 29.2 ppm. Aluminum atoms influenced by four proximate oxygen atoms [Al(O)$_4$] present a peak at about 52.5 ppm. For the alkyl-aluminum zeolite and the hydride-aluminum zeolite, the Al(O)$_6$ peak dominates, whereas for the hydroxyl-aluminum zeolite the Al(O)$_4$ peak dominates. The Al(O)$_4$ peak of the hydroxyl-aluminum zeolite is believed to have increased as a result of the [Al—OH] species. In all cases, the $^{27}$Al SS-NMR spectra evidence that the alkyl-aluminum zeolite, the hydride-aluminum zeolite, and the hydroxyl-aluminum zeolite includes tetra-coordinate aluminum atoms in the respective zeolite frameworks.

Figure 23:
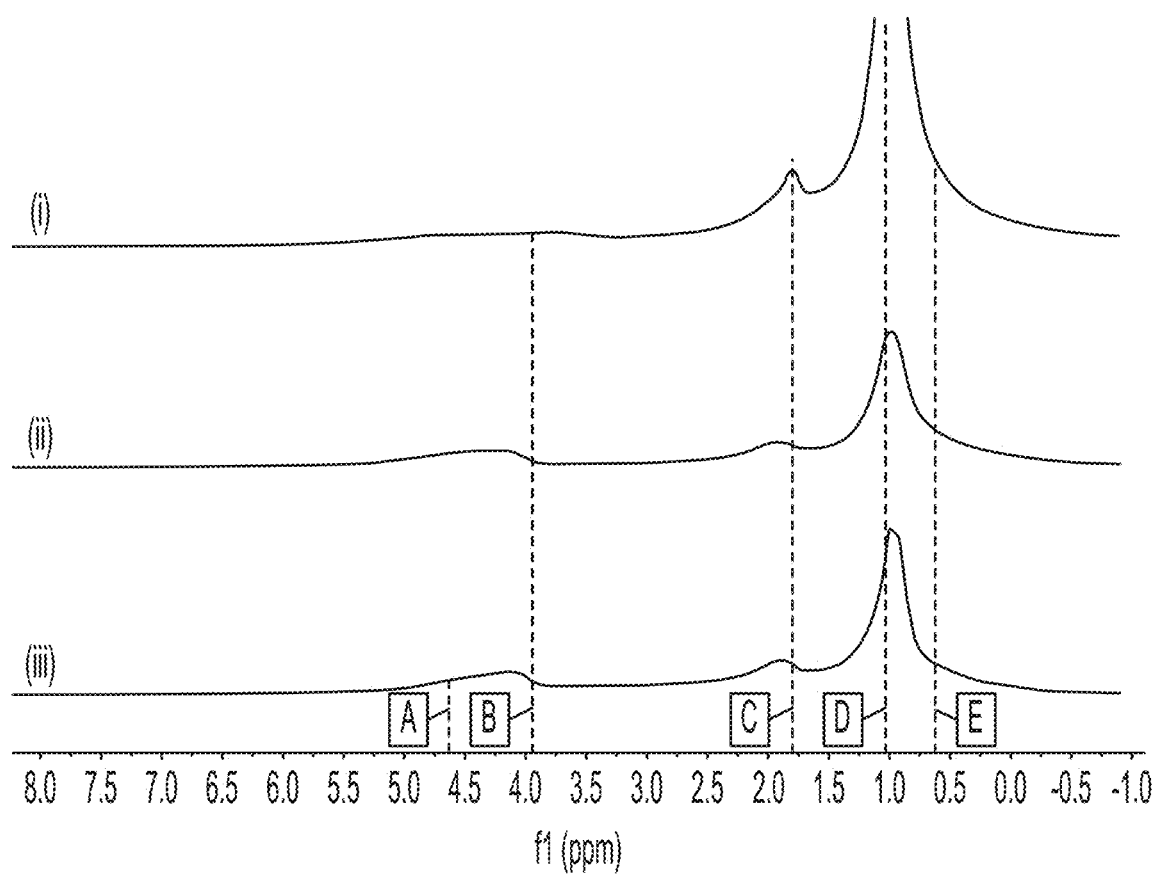
FIG. 23 shows stacked proton ($^1$H) SS-NMR spectra of (i) the alkyl-aluminum zeolite prepared by reaction of dehydroxylated H-ZSM-5 with DIBAL; (ii) the hydride-aluminum zeolite prepared by thermal treatment of the alkyl-aluminum zeolite; and (iii) the hydroxide-aluminum zeolite prepared by oxidizing the hydride-aluminum zeolite.

Similarly, the $^1$H SS-NMR spectra of FIG. 23 show the evolution of aluminum environments from (i) the alkyl-aluminum zeolite of Example 1 to (ii) the hydride-aluminum zeolite of Example 2 to (iii) the hydroxyl-aluminum zeolite of the present Example 3. Vertical lines highlight peak regions of particular interest. Line A is the peak position of the hydrogen atom on the [≡Al—OH] species, at which only the hydroxyl-aluminum zeolite shows a signal. Line B is the peak position of the hydrogen atoms of silyl hydrides [≡Si—H], silyl dihydrides [═Si(H)$_2$], and aluminum hydrides [≡Al—H], at which only the hydride-aluminum zeolite and the hydroxyl-aluminum zeolite show signals. Line C is the peak position for single hydrogen atoms on the beta carbon atom of the isobutyl groups of [≡Si—CH$_2$CH(CH$_3$)$_2$] and [≡Al—CH$_2$CH(CH$_3$)$_2$]. All three zeolites show signals at this position, with the peak for the alkyl-aluminum zeolite being most prominent, owing to the presence of isobutyl-aluminum species [≡Al—CH$_2$CH(CH$_3$)$_2$] in addition to isobutyl-siloxane species [≡Si—CH$_2$CH(CH$_3$)$_2$]. Line D is the peak position corresponding to stretches of the six equivalent hydrogen atoms on the terminal methyl groups of the isobutyl groups of [≡Si—CH$_2$CH(CH$_3$)$_2$] and [≡Al—CH$_2$CH(CH$_3$)$_2$]. All three zeolites include prominent peaks at this position, again with the peak for the alkyl-aluminum zeolite being most prominent, owing to the presence of isobutyl-aluminum species [≡Al—CH$_2$CH(CH$_3$)$_2$] in addition to isobutyl-siloxane species [≡Si—CH$_2$CH(CH$_3$)$_2$]. Line E is the peak position of the two equivalent hydrogen atoms on the alpha carbon atom of the isobutyl groups [≡Si—CH$_2$CH(CH$_3$)$_2$] and [≡Al—CH$_2$CH(CH$_3$)$_2$]. The peaks corresponding to these hydrogen atoms are difficult to discern as shoulders beside the strong peaks at line D.

Items Listing

Embodiments of the present disclosure include at least the following items, which are not intended to limit the scope of the disclosure as a whole or of the appended claims.

Item A1: A modified crystalline zeolite material having a zeolite framework, the zeolite framework comprising both tetra-coordinate Lewis aluminum single sites and Brønsted aluminum sites incorporated in the zeolite framework, the tetra-coordinate Lewis aluminum single sites having an environment in the zeolite framework according to structure (A-I) as previously described herein, where: each R is independently selected from the group consisting of an alkyl, a hydride, and a hydroxyl; and each $Si_Q$ is a silicon atom of the zeolite framework and is bonded to four oxygen atoms, the Brønsted aluminum sites having an environment in the zeolite framework according to structure (A-II) as previously described herein, where each $Si_Q$ is a silicon atom of the zeolite framework and is bonded to four oxygen atoms.

Item A2: The modified crystalline zeolite material of Item A1, wherein each R in the zeolite framework is independently selected from the group consisting of isobutyl, hydride, and hydroxyl.

Item A3: The modified crystalline zeolite material of Item A1 or A2, wherein the tetra-coordinate Lewis aluminum single sites of the modified crystalline zeolite material comprise at least two of (a), (b), and (c): (a) tetra-coordinate Lewis aluminum single sites having an environment in the zeolite framework according to structure (A-I), where R is an alkyl; (b) tetra-coordinate Lewis aluminum single sites having an environment in the zeolite framework according to structure (A-I), where R is a hydride; and (c) tetra-coordinate Lewis aluminum single sites having an environment in the zeolite framework according to structure (A-I), where R is a hydroxyl.

Item A4: The modified crystalline zeolite material of any of the previous Items, wherein each R in the zeolite framework is independently selected from the group consisting of isobutyl, hydride, and hydroxyl.

Item A5: The modified crystalline zeolite material of any of the previous Items, wherein the tetra-coordinate Lewis aluminum single sites of the modified crystalline zeolite material comprise at least two of (a), (b), and (c): (a) tetra-coordinate Lewis aluminum single sites having an environment in the zeolite framework according to structure (A-I), where R is isobutyl; (b) tetra-coordinate Lewis aluminum single sites having an environment in the zeolite framework according to structure (A-I), where R is a hydride; and (c) tetra-coordinate Lewis aluminum single sites having an environment in the zeolite framework according to structure (A-I), where R is a hydroxyl.

Item A6: The modified crystalline zeolite material of Item A1, wherein each R is hydride.

Item A7: The modified crystalline zeolite material of Item A1, wherein each R is hydroxyl.

Item A8: The modified crystalline zeolite material of Item A1, wherein each R is a ($C_1$-$C_{20}$) alkyl.

Item A9: The modified crystalline zeolite material of Item A1, wherein each R is isobutyl.

Item A10: The modified crystalline zeolite material of any of the previous Items, wherein the modified crystalline zeolite material exhibits at least one band as measured by Fourier Transform Infrared Spectroscopy chosen from (a), (b), (c), and combinations thereof: (a) a band in the range 2850 $cm^{-1}$ to 2990 $cm^{-1}$ that is characteristic of aluminum-alkyl bonds of tetra-coordinate alkyl aluminum single sites; (b) a band at 1952 $cm^{-1}$ that is characteristic of aluminum-hydride bonds of tetra-coordinate aluminum hydride single sites; and (c) a band at 3787 $cm^{-1}$ that is characteristic of aluminum-hydroxyl bonds at tetra-coordinate Lewis aluminum single sites.

Item A11: The modified crystalline zeolite material of any of the previous Items, wherein the modified crystalline zeolite material is an aluminosilicate zeolite modified to include the tetra-coordinate Lewis aluminum single sites.

Item A12: The modified crystalline zeolite material of any of the previous Items, wherein the modified crystalline zeolite material is a zeolite with an MFI framework modified to include the tetra-coordinate Lewis aluminum single sites.

Item A13: The modified crystalline zeolite material of any of the previous Items, wherein the modified crystalline zeolite material is a ZSM-5 zeolite modified to include the tetra-coordinate Lewis aluminum single sites, an H-ZSM-5 zeolite modified to include the tetra-coordinate Lewis aluminum single sites, or an FH-ZSM-5 zeolite modified to include the tetra-coordinate Lewis aluminum single sites.

Item A14: The modified crystalline zeolite material of any of the previous Items, wherein the modified crystalline zeolite material is chosen from aluminosilicate zeolites, aluminophosphate zeolites, metal-substituted aluminophosphate zeolites, and silicoaluminophosphate zeolites.

Item A15: The modified crystalline zeolite material of any of the previous Items, wherein the modified crystalline zeolite material is an aluminosilicate zeolite.

Item A16: The modified crystalline zeolite material of any of the previous Items, wherein the modified crystalline zeolite material comprises micropores having micropore sizes less than 2 nm and mesopores having mesopore sizes from 2 nm to 50 nm.

Item B1: A method for incorporating tetra-coordinate Lewis aluminum single sites into a crystalline zeolite material having a zeolite framework comprising Brønsted aluminum sites, the method comprising: contacting the crystalline zeolite material with a dialkylaluminum hydride of empirical formula $R_2AlH$, where each R is alkyl, to react the dialkylaluminum hydride with the zeolite framework and form tetra-coordinate alkyl aluminum single sites having an environment in the zeolite framework according to structure (B-I) as previously described herein, where each $Si_Q$ is a silicon atom of the zeolite framework and is bonded to four oxygen atoms, thereby forming a modified crystalline zeolite material that is an alkyl-aluminum zeolite.

Item B2: The method of Item B1, wherein the Brønsted aluminum sites of the crystalline zeolite material do not react with the dialkylaluminum hydride.

Item B3: The method of Item B1 or B2, wherein: the crystalline zeolite material is an aluminosilicate zeolite; the dialkylaluminum hydride reacts selectively with silanol groups of the aluminosilicate zeolite; and the Brønsted aluminum sites of the crystalline zeolite material do not react with the dialkylaluminum hydride.

Item B4: The method of any of Items B1 to B3, wherein the alkyl-aluminum zeolite exhibits a band in the range 2850 $cm^{-1}$ to 2990 $cm^{-1}$ as measured by Fourier Transform Infrared Spectroscopy that is characteristic of aluminum-alkyl bonds of the tetra-coordinate alkyl aluminum single sites.

Item B5: The method of any of Items B1 to B4, wherein each R is isobutyl.

Item B6: The method of any of Items B1 to B5, further comprising: dehydroxylating the crystalline zeolite material before contacting the crystalline zeolite material with the dialkylaluminum hydride.

Item B7: The method of Item B6, wherein dehydroxylating the crystalline zeolite material comprises heating the crystalline zeolite material at a temperature of at least 600° C., for a dehydroxylation time sufficient to remove residual water from pores of the crystalline zeolite material and to condense vicinal hydroxyl to release water and thereby form isolated silanol species.

Item B8: The method of any of Items B1 to B7, wherein the crystalline zeolite material is an aluminosilicate zeolite selected from the group consisting of MFI framework zeolites, *BEA framework zeolites, MOR framework zeolites, CHA framework zeolites, FAU framework zeolites, zeolite Y, ultra-stable zeolite Y (USY), ZSM-5, H-ZSM-5, FH-ZSM-5, and intergrowth zeolites containing at least one of the foregoing aluminosilicate zeolites intergrown with another aluminosilicate zeolite of any framework type.

Item B9: The method of any of Items B1 to B8, further comprising: heating the alkyl-aluminum zeolite to induce β-hydride elimination of at least a portion of the alkyl groups R and thereby form tetra-coordinate aluminum hydride single sites having an environment in the zeolite framework according to structure (B-II) as previously described herein, where each $Si_Q$ is a silicon atom of the zeolite framework and is bonded to four oxygen atoms, thereby forming a modified crystalline zeolite material that is a hydride-aluminum zeolite.

Item 10: The method of Item B9, wherein the hydride-aluminum zeolite exhibits a band at 1952 $cm^{-1}$ as measured by Fourier Transform Infrared Spectroscopy that is characteristic of aluminum-hydride bonds of the tetra-coordinate aluminum hydride single sites.

Item B11: The method of any of Items B9 to B10, further comprising: oxidizing the hydride-aluminum zeolite to convert at least a portion of the tetra-coordinate aluminum hydride single sites to tetra-coordinate aluminum hydroxide single sites having an environment in the zeolite framework according to structure (B-III) as previously described herein, where each $Si_Q$ is a silicon atom of the zeolite framework and is bonded to four oxygen atoms, thereby forming a modified crystalline zeolite material that is a hydroxyl-aluminum zeolite.

Item B12: The method of Item B11, wherein at least 1% of aluminum atoms in the hydroxyl-aluminum zeolite are present in the tetra-coordinate aluminum hydroxide single sites.

Item B13: The method of Item B11 or B12, wherein the hydroxyl-aluminum zeolite exhibits a band at 3787 $cm^{-1}$ as measured by Fourier Transform Infrared Spectroscopy that is characteristic of aluminum-hydroxyl bonds of the tetra-coordinate aluminum hydroxide single sites.

Item B14: The method of any of Items B1 to B13, wherein the crystalline zeolite material is chosen from aluminosilicate zeolites, aluminophosphate zeolites, metal-substituted aluminophosphate zeolites, and silicoaluminophosphate zeolites.

Item B15: The method of any of Items B1 to B14, wherein the crystalline zeolite material is an aluminosilicate zeolite.

Item B16: The method of any of Items B1 to B15, wherein the crystalline zeolite material is an aluminosilicate zeolite having an MFI framework, a *BEA framework, a FAU framework, or an intergrowth zeolite containing at least one of the foregoing aluminosilicate zeolites intergrown with another aluminosilicate zeolite of any framework type.

Item B17: The method of any of Items B1 to B16, wherein the crystalline zeolite material is a zeolite Y or an ultra-stable zeolite Y (USY).

Item B18: The method of any of Items B1 to B17, wherein the crystalline zeolite material is ZSM-5, H-ZSM-5, or FH-ZSM-5.

Item $C_1$: A modified crystalline zeolite material formed according to the method of any one of Items B1 to B18.

Item D1: Use of a modified crystalline zeolite material according to any one of Items A1 to A16, or a modified crystalline zeolite material formed according to the method of any one of Items B1 to B18, as a catalyst or catalyst additive in an industrial process.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modified crystalline zeolite material having a zeolite framework, the zeolite framework comprising both tetra-coordinate Lewis aluminum single sites and Brønsted aluminum sites incorporated in the zeolite framework, the tetra-coordinate Lewis aluminum single sites having an environment in the zeolite framework according to structure (A-I):

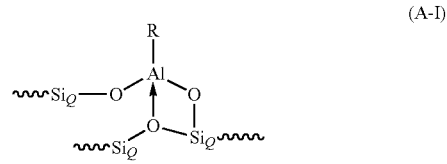

where:
  each R is independently selected from the group consisting of an alkyl, a hydride, and a hydroxyl; and
  each $Si_Q$ is a silicon atom of the zeolite framework and is bonded to four oxygen atoms, the Brønsted aluminum sites having an environment in the zeolite framework according to structure (A-II):

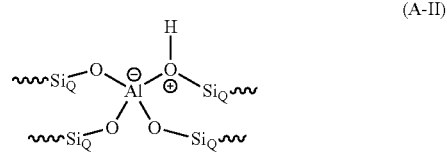

where each $Si_Q$ is a silicon atom of the zeolite framework and is bonded to four oxygen atoms.

2. The modified crystalline zeolite material of claim 1, wherein the tetra-coordinate Lewis aluminum single sites of the modified crystalline zeolite material comprise at least two of (a), (b), and (c):
  (a) tetra-coordinate Lewis aluminum single sites having an environment in the zeolite framework according to structure (A-I), where R is an alkyl;

(b) tetra-coordinate Lewis aluminum single sites having an environment in the zeolite framework according to structure (A-I), where R is a hydride; and (c) tetra-coordinate Lewis aluminum single sites having an environment in the zeolite framework according to structure (A-I), where R is a hydroxyl.

3. The modified crystalline zeolite material of claim 1, wherein the modified crystalline zeolite material exhibits at least one band as measured by Fourier Transform Infrared Spectroscopy chosen from (a), (b), (c), or combinations thereof:

(a) a band in the range 2850 cm$^{-1}$ to 2990 cm$^{-1}$ that is characteristic of aluminum-alkyl bonds of tetra-coordinate alkyl aluminum sites; or (b) a band at 1952 cm$^{-1}$ that is characteristic of aluminum-hydride bonds of tetra-coordinate aluminum hydride sites; or (c) a band at 3787 cm$^{-1}$ that is characteristic of aluminum-hydroxyl bonds at tetra-coordinate Lewis aluminum sites.

4. The modified crystalline zeolite material of claim 1, wherein each R in the zeolite framework is independently selected from the group consisting of isobutyl, hydride, and hydroxyl.

5. The modified crystalline zeolite material of claim 1, wherein the tetra-coordinate Lewis aluminum single sites of the modified crystalline zeolite material comprise at least two of (a), (b), and (c):

(a) tetra-coordinate Lewis aluminum single sites having an environment in the zeolite framework according to structure (A-I), where R is isobutyl;

(b) tetra-coordinate Lewis aluminum single sites having an environment in the zeolite framework according to structure (A-I), where R is a hydride; and (c) tetra-coordinate Lewis aluminum single sites having an environment in the zeolite framework according to structure (A-I), where R is a hydroxyl.

6. The modified crystalline zeolite material of claim 1, wherein the modified crystalline zeolite material is an aluminosilicate zeolite modified to include the tetra-coordinate Lewis aluminum single sites.

7. The modified crystalline zeolite material of claim 1, wherein the modified crystalline zeolite material is a zeolite with an MFI framework modified to include the tetra-coordinate Lewis aluminum single sites.

8. The modified crystalline zeolite material of claim 1, wherein the modified crystalline zeolite material is a ZSM-5 zeolite modified to include the tetra-coordinate Lewis aluminum single sites, an H-ZSM-5 zeolite modified to include the tetra-coordinate Lewis aluminum single sites, or an FH-ZSM-5 zeolite modified to include the tetra-coordinate Lewis aluminum single sites.

9. A method for incorporating tetra-coordinate Lewis aluminum single sites into a crystalline zeolite material having a zeolite framework comprising Brønsted aluminum sites, the Brønsted aluminum sites having an environment in the zeolite framework according to structure (A-II):

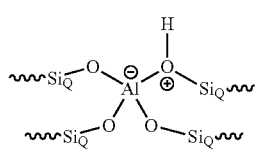

(A-II)

the method comprising:

contacting the crystalline zeolite material with a dialkylaluminum hydride of empirical formula $R_2AlH$, where each R is alkyl, to react the dialkylaluminum hydride with the zeolite framework and form tetra-coordinate alkyl aluminum single sites having an environment in the zeolite framework according to structure (B-I):

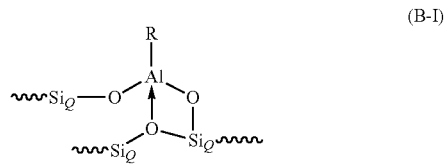

(B-I)

where each $Si_Q$ is a silicon atom of the zeolite framework and is bonded to four oxygen atoms, thereby forming a modified crystalline zeolite material that is an alkyl-aluminum zeolite.

10. The method of claim 9, wherein:

the crystalline zeolite material is an aluminosilicate zeolite;

the dialkylaluminum hydride reacts selectively with silanol groups of the aluminosilicate zeolite; and the Brønsted aluminum sites of the crystalline zeolite material do not react with the dialkylaluminum hydride.

11. The method of claim 9, wherein the alkyl-aluminum zeolite exhibits a band in the range 2850 cm$^{-1}$ to 2990 cm$^{-1}$ as measured by Fourier Transform Infrared Spectroscopy that is characteristic of aluminum-alkyl bonds of the tetra-coordinate alkyl aluminum sites.

12. The method of claim 9, wherein each R is isobutyl.

13. The method of claim 9, further comprising:

dehydroxylating the crystalline zeolite material before contacting the crystalline zeolite material with the dialkylaluminum hydride.

14. The method of claim 13, wherein dehydroxylating the crystalline zeolite material comprises heating the crystalline zeolite material at a temperature of at least 600° C., for a dehydroxylation time sufficient to remove residual water from pores of the crystalline zeolite material to condense vicinal hydroxyl to release water and thereby form isolated silanol species.

15. The method of claim 9, wherein the crystalline zeolite material is an aluminosilicate zeolite selected from the group consisting of MFI framework zeolites, *BEA framework zeolites, MOR framework zeolites, CHA framework zeolites, FAU framework zeolites, zeolite Y, ultra-stable zeolite Y (USY), ZSM-5, H-ZSM-5, FH-ZSM-5, and intergrowth zeolites containing at least one of the foregoing aluminosilicate zeolites intergrown with another aluminosilicate zeolite of any framework type.

16. The method of claim 9, further comprising:

heating the alkyl-aluminum zeolite to induce β-hydride elimination of at least a portion of the alkyl groups R and thereby form tetra-coordinate aluminum hydride single sites having an environment in the zeolite framework according to structure (B-II):

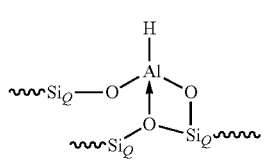 (B-II)

where each $Si_Q$ is a silicon atom of the zeolite framework and is bonded to four oxygen atoms, thereby forming a modified crystalline zeolite material that is a hydride-aluminum zeolite.

17. The method of claim 16, wherein the hydride-aluminum zeolite exhibits a band at 1952 cm$^{-1}$ as measured by Fourier Transform Infrared Spectroscopy that is characteristic of aluminum-hydride bonds of the tetra-coordinate aluminum hydride sites.

18. The method of claim 16, further comprising:
oxidizing the hydride-aluminum zeolite to convert at least a portion of the tetra-coordinate aluminum hydride single sites to tetra-coordinate aluminum hydroxide single sites having an environment in the zeolite framework according to structure (B-III):

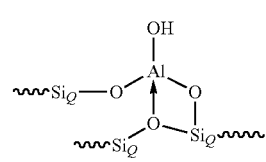 (B-III)

where each $Si_Q$ is a silicon atom of the zeolite framework and is bonded to four oxygen atoms, thereby forming a modified crystalline zeolite material that is a hydroxyl-aluminum zeolite.

19. The method of claim 18, wherein at least 1% of aluminum atoms in the hydroxyl-aluminum zeolite are present in the tetra-coordinate aluminum hydroxide single sites.

20. The method of claim 18, wherein the hydroxyl-aluminum zeolite exhibits a band at 3787 cm$^{-1}$ as measured by Fourier Transform Infrared Spectroscopy that is characteristic of aluminum-hydroxyl bonds of the tetra-coordinate aluminum hydroxide single sites.

* * * * *